(12) United States Patent
Devaraj et al.

(10) Patent No.: US 10,580,404 B2
(45) Date of Patent: Mar. 3, 2020

(54) INDICATOR FOR VOICE-BASED COMMUNICATIONS

(71) Applicant: Amazon Technologies, Inc., Seattle, WA (US)

(72) Inventors: Christo Frank Devaraj, Seattle, WA (US); Manish Kumar Dalmia, Seattle, WA (US); Tony Roy Hardie, Seattle, WA (US); Ran Mokady, Seattle, WA (US); Nick Ciubotariu, Kenmore, WA (US); Sandra Lemon, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 44 days.

(21) Appl. No.: 15/254,600

(22) Filed: Sep. 1, 2016

(65) Prior Publication Data
US 2018/0061404 A1   Mar. 1, 2018

(51) Int. Cl.
| | |
|---|---|
| *G10L 21/00* | (2013.01) |
| *G10L 15/22* | (2006.01) |
| *H04L 12/58* | (2006.01) |
| *G10L 15/30* | (2013.01) |
| *H04L 29/08* | (2006.01) |
| *G06F 17/27* | (2006.01) |
| *G06F 3/16* | (2006.01) |
| *G10L 15/08* | (2006.01) |

(Continued)

(52) U.S. Cl.
CPC .............. *G10L 15/22* (2013.01); *G06F 3/167* (2013.01); *G06F 17/279* (2013.01); *G10L 15/30* (2013.01); *H04L 51/10* (2013.01); *H04L 51/24* (2013.01); *H04L 67/306* (2013.01); *G06K 9/00362* (2013.01); *G10L 13/00* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,317,488 B1 * | 11/2001 | DePond | H04M 1/80 379/142.08 |
| 6,725,193 B1 | 4/2004 | Makovicka | |
| | (Continued) | | |

OTHER PUBLICATIONS

International Search Report and Written Opinion for Application No. PCT/US2017/049578, dated Nov. 17, 2017.

(Continued)

*Primary Examiner* — Richard Z Zhu
(74) *Attorney, Agent, or Firm* — Pierce Atwood LLP

(57) ABSTRACT

Systems, methods, and devices for outputting indications regarding voice-based interactions are described. A first speech-controlled device detects spoken audio corresponding to recipient information. The first device captures the audio and sends audio data corresponding to the captured audio to a server. The server determines a second speech-controlled device of the recipient and sends a signal to the recipient's second speech-controlled device representing a message is forthcoming. The recipient's second speech-controlled device outputs and indication representing a message is forthcoming.

20 Claims, 21 Drawing Sheets

(51) Int. Cl.
*G10L 13/00* (2006.01)
*G06K 9/00* (2006.01)

(56) References Cited

U.S. PATENT DOCUMENTS

| | | | | |
|---|---|---|---|---|
| 6,937,977 B2* | 8/2005 | Gerson | ............ | G10L 25/78 370/522 |
| 7,773,983 B2 | 8/2010 | Takeda | | |
| 7,831,207 B2* | 11/2010 | Mercurio | ............ | H04W 12/06 455/158.4 |
| 7,949,353 B2* | 5/2011 | Pollock | ............ | H04W 4/18 455/412.1 |
| 8,166,119 B2* | 4/2012 | Ligh | ............ | G06F 3/04886 709/206 |
| 8,484,344 B2* | 7/2013 | Butterfield | ............ | H04M 3/42382 709/202 |
| 8,572,696 B1* | 10/2013 | Wiacek | ............ | H04W 4/02 380/247 |
| 8,635,481 B1 | 1/2014 | Lachwani | | |
| 8,805,690 B1* | 8/2014 | Lebeau | ............ | G06F 3/165 704/275 |
| 9,208,785 B2* | 12/2015 | Ben-David | ............ | G10L 15/30 |
| 9,307,363 B2* | 4/2016 | Kitchen | ............ | H04W 4/023 |
| 9,497,603 B1* | 11/2016 | Singleton | ............ | H04W 4/14 |
| 9,568,983 B1 | 2/2017 | Lachwani | | |
| 9,734,845 B1 | 8/2017 | Liu | | |
| 9,756,056 B2* | 9/2017 | Churyumov | ............ | H04L 63/12 |
| 10,074,369 B2* | 9/2018 | Devaraj | ............ | G10L 15/22 |
| 2005/0164681 A1* | 7/2005 | Jenkins | ............ | H04M 1/7255 455/412.1 |
| 2007/0130337 A1* | 6/2007 | Arnison | ............ | G06F 3/16 709/225 |
| 2009/0276224 A1 | 11/2009 | Medina | | |
| 2012/0259633 A1 | 10/2012 | Aihara et al. | | |
| 2013/0085761 A1* | 4/2013 | Bringert | ............ | G06F 3/167 704/275 |
| 2014/0172953 A1* | 6/2014 | Blanksteen | ............ | H04W 4/02 709/203 |
| 2014/0337028 A1 | 11/2014 | Wang et al. | | |
| 2015/0025891 A1* | 1/2015 | Goldberg | ............ | G10L 13/033 704/260 |
| 2016/0098992 A1 | 4/2016 | Renard et al. | | |
| 2018/0061403 A1* | 3/2018 | Devaraj | ............ | G10L 15/22 |

OTHER PUBLICATIONS

"Non-Final Office Action dated Jan. 19, 2018", U.S. Appl. No. 15/254,359, 16 pages.

Ivinternational Preliminary Report on Patentability and Written Opinion for Application No. PCT/US2017/049578, dated Mar. 14, 2019.

* cited by examiner

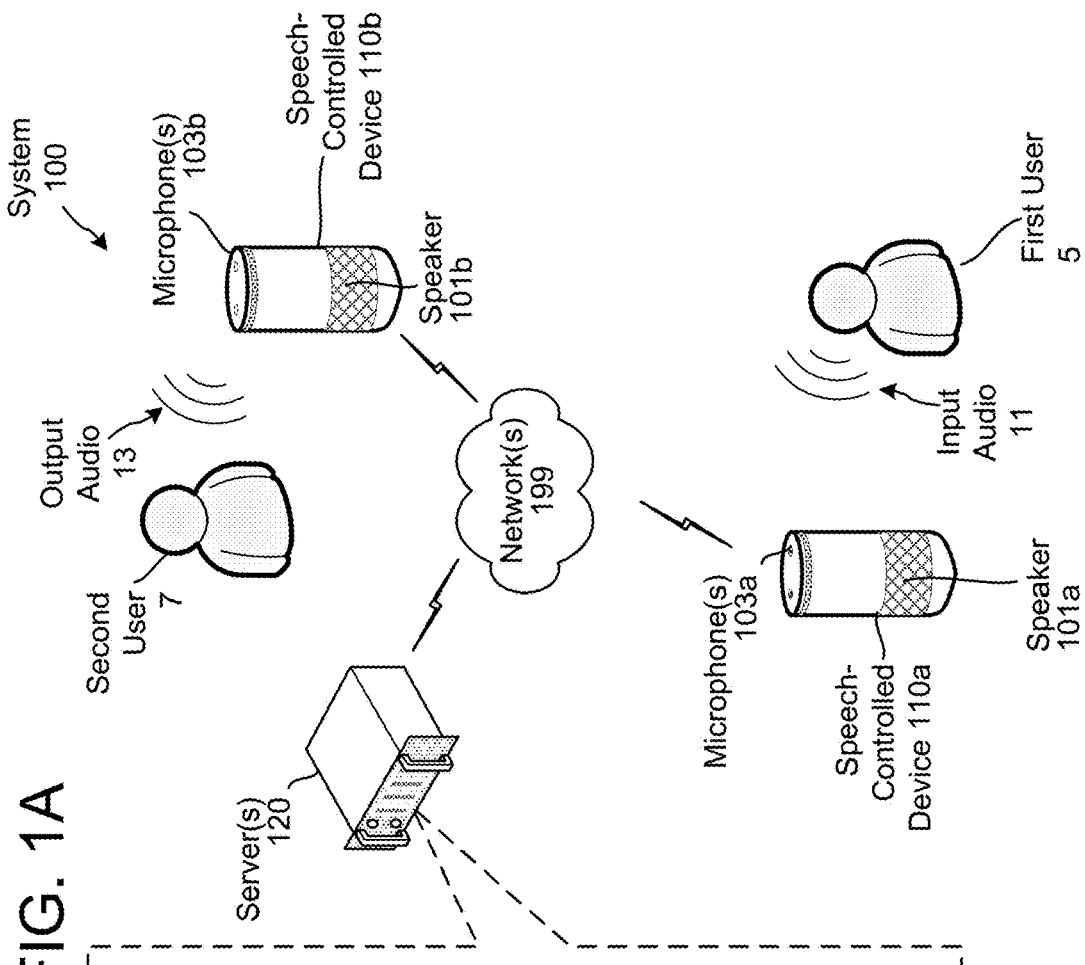
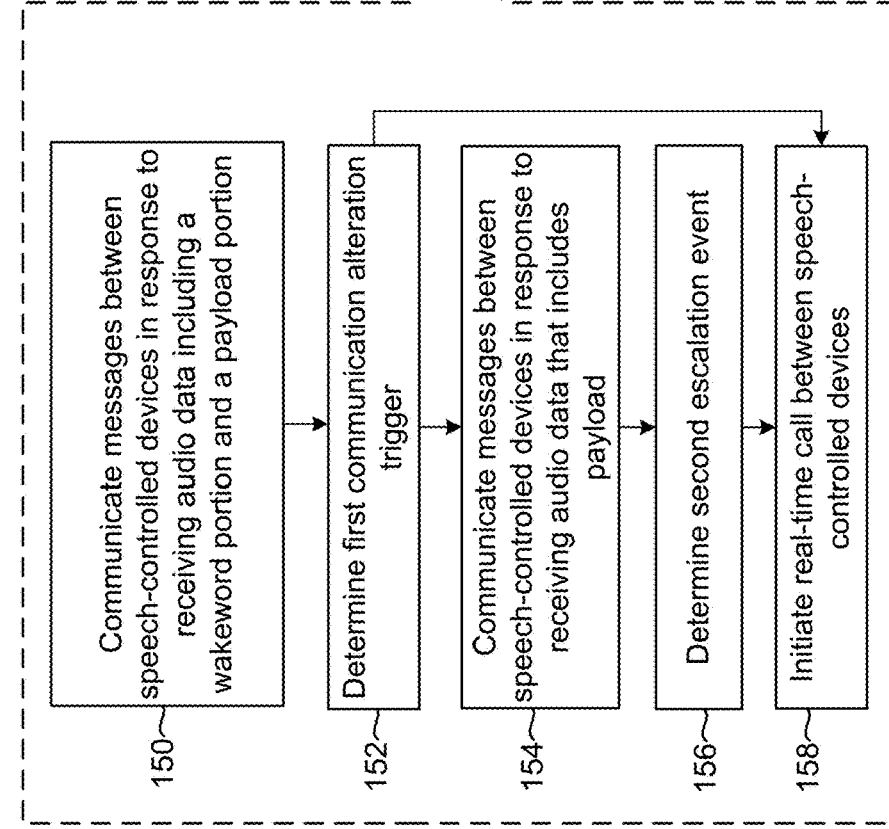

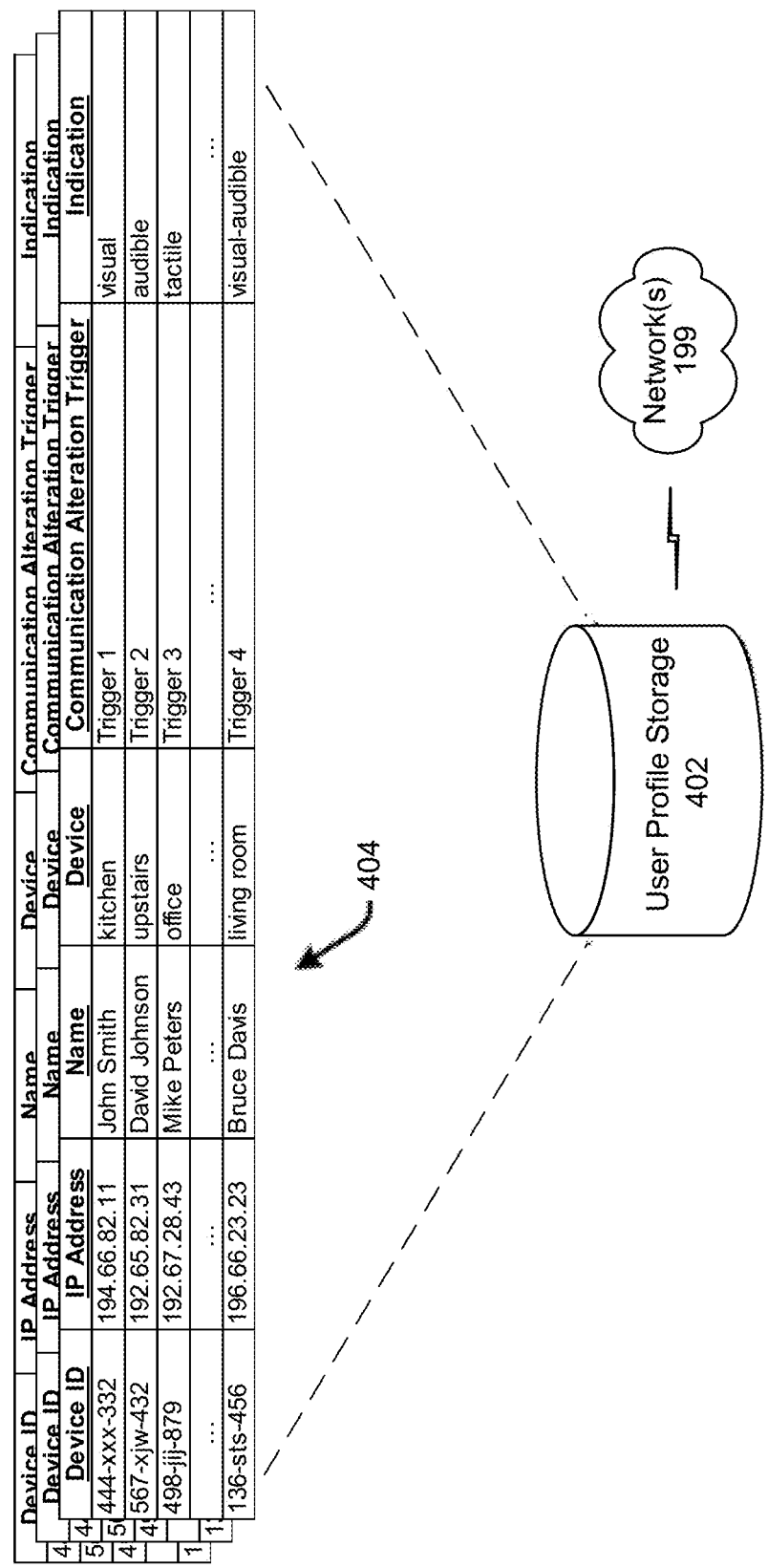

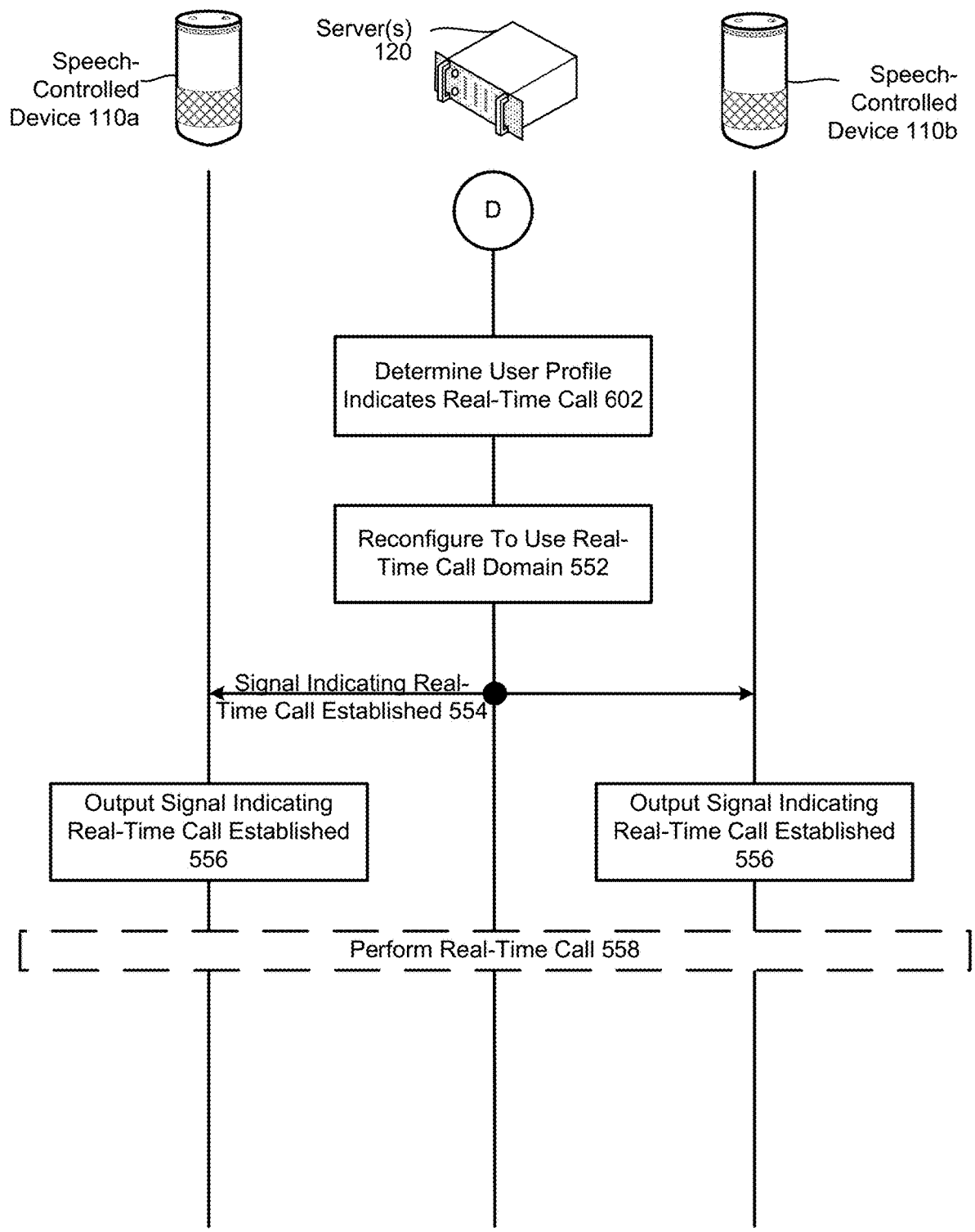

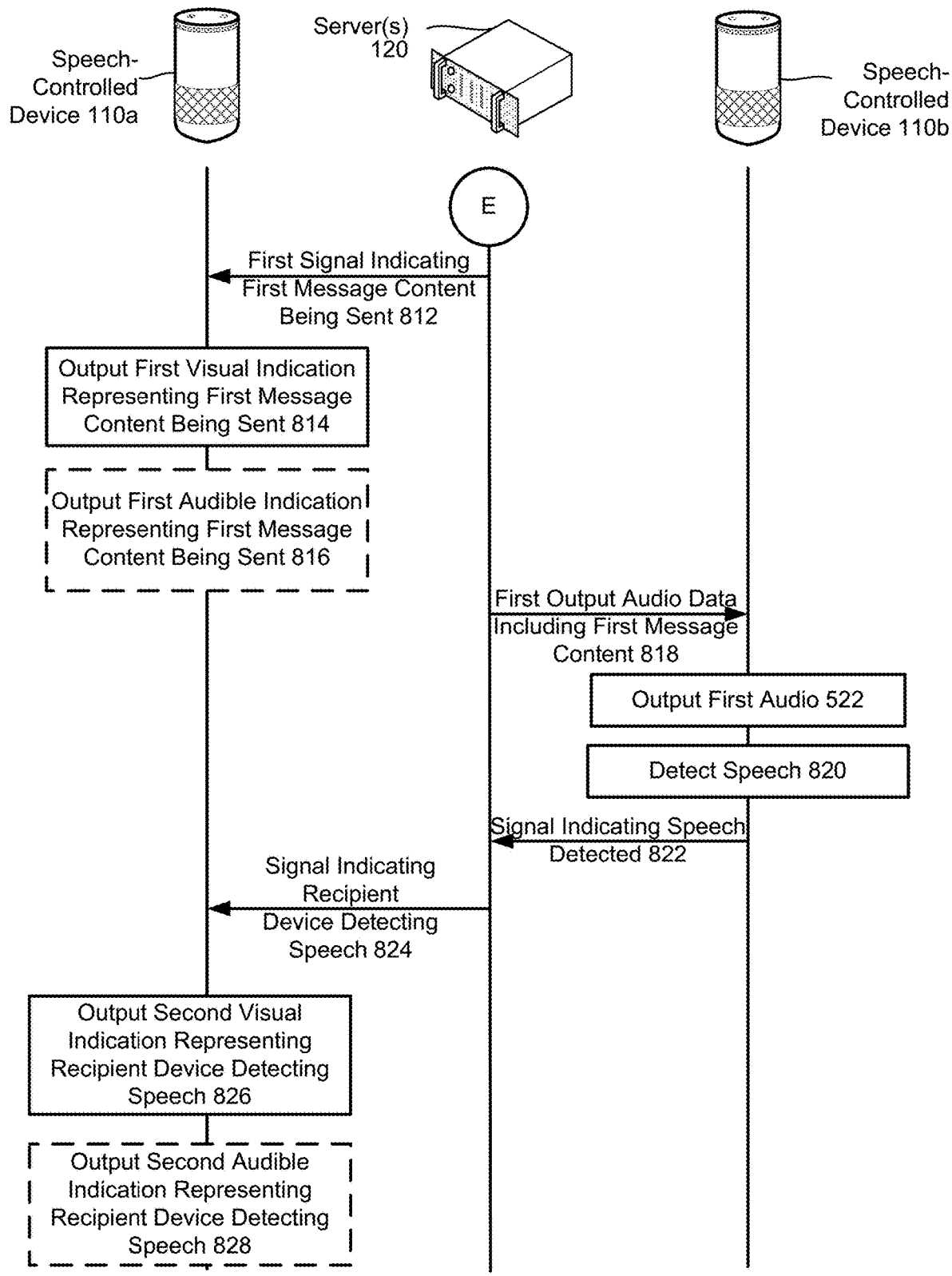

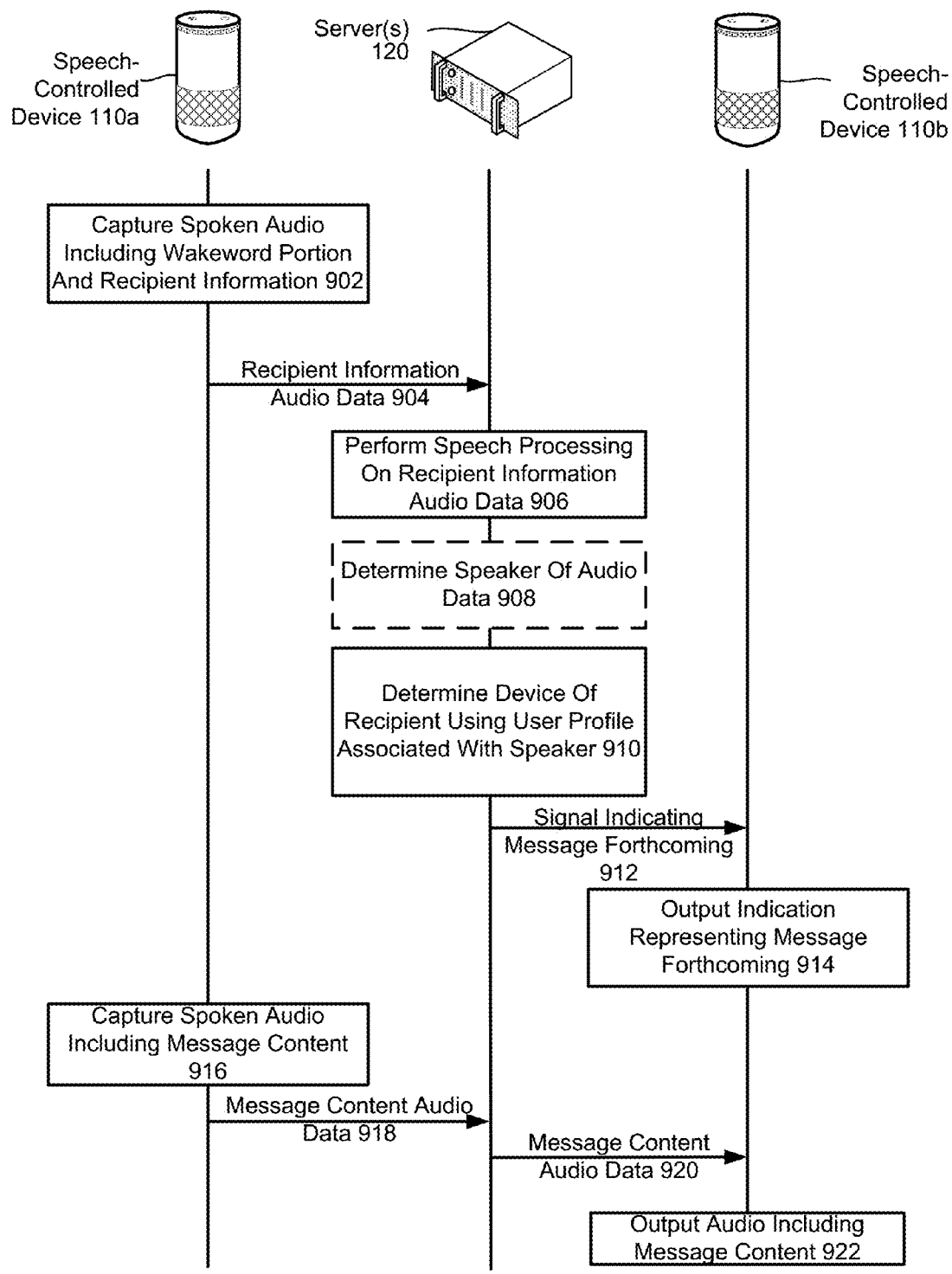

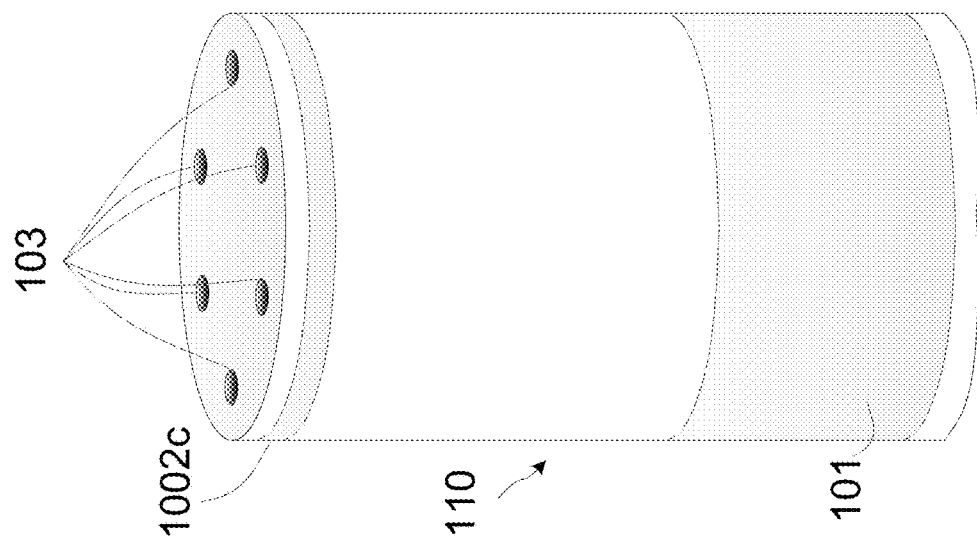
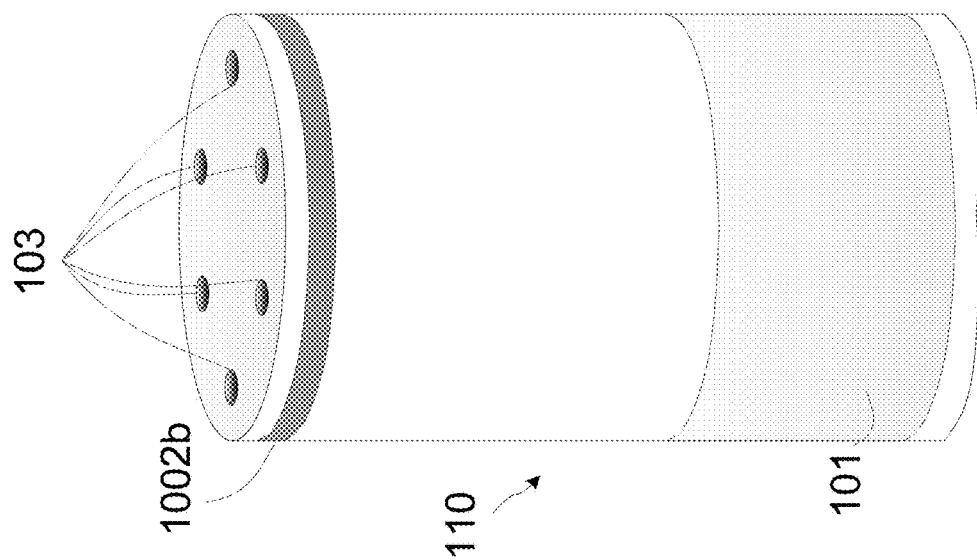
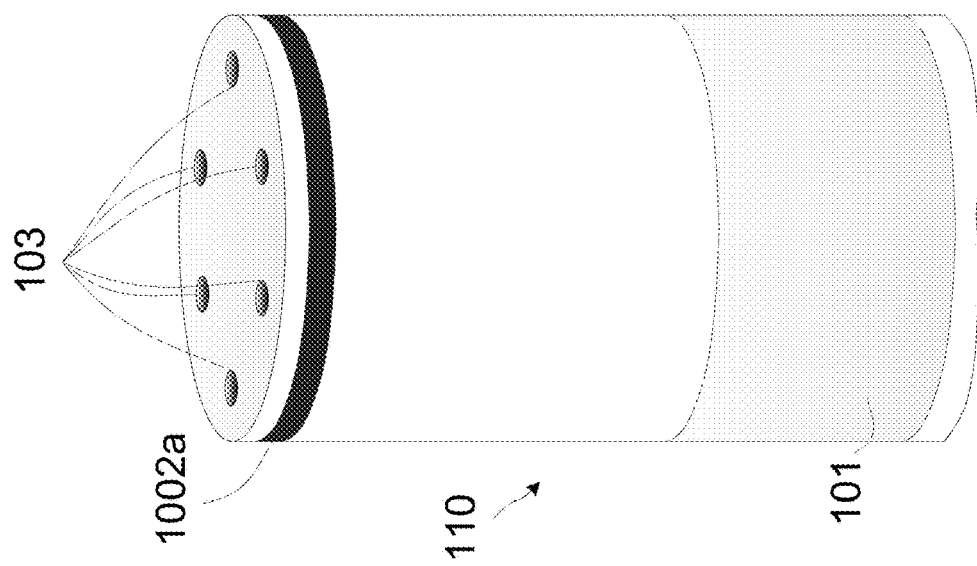

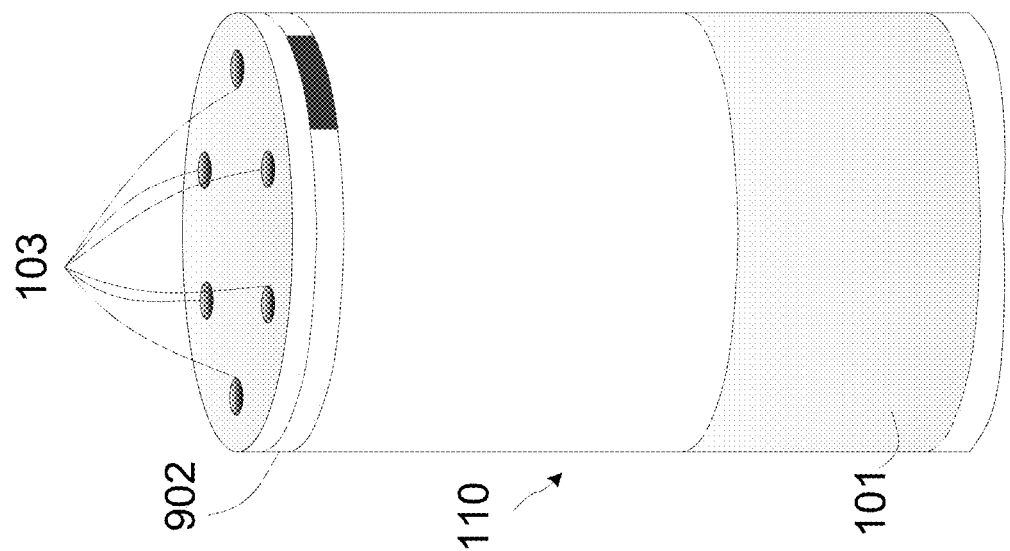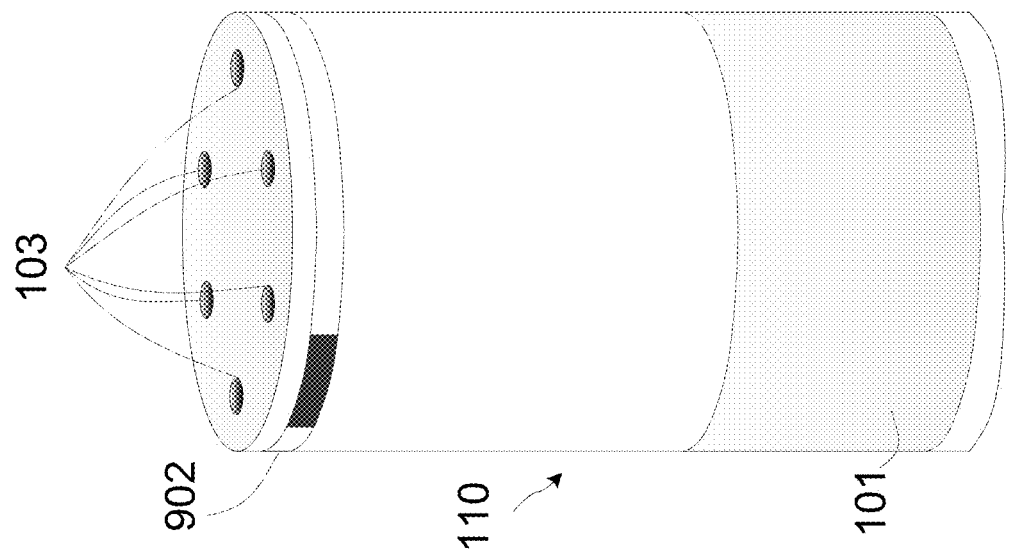

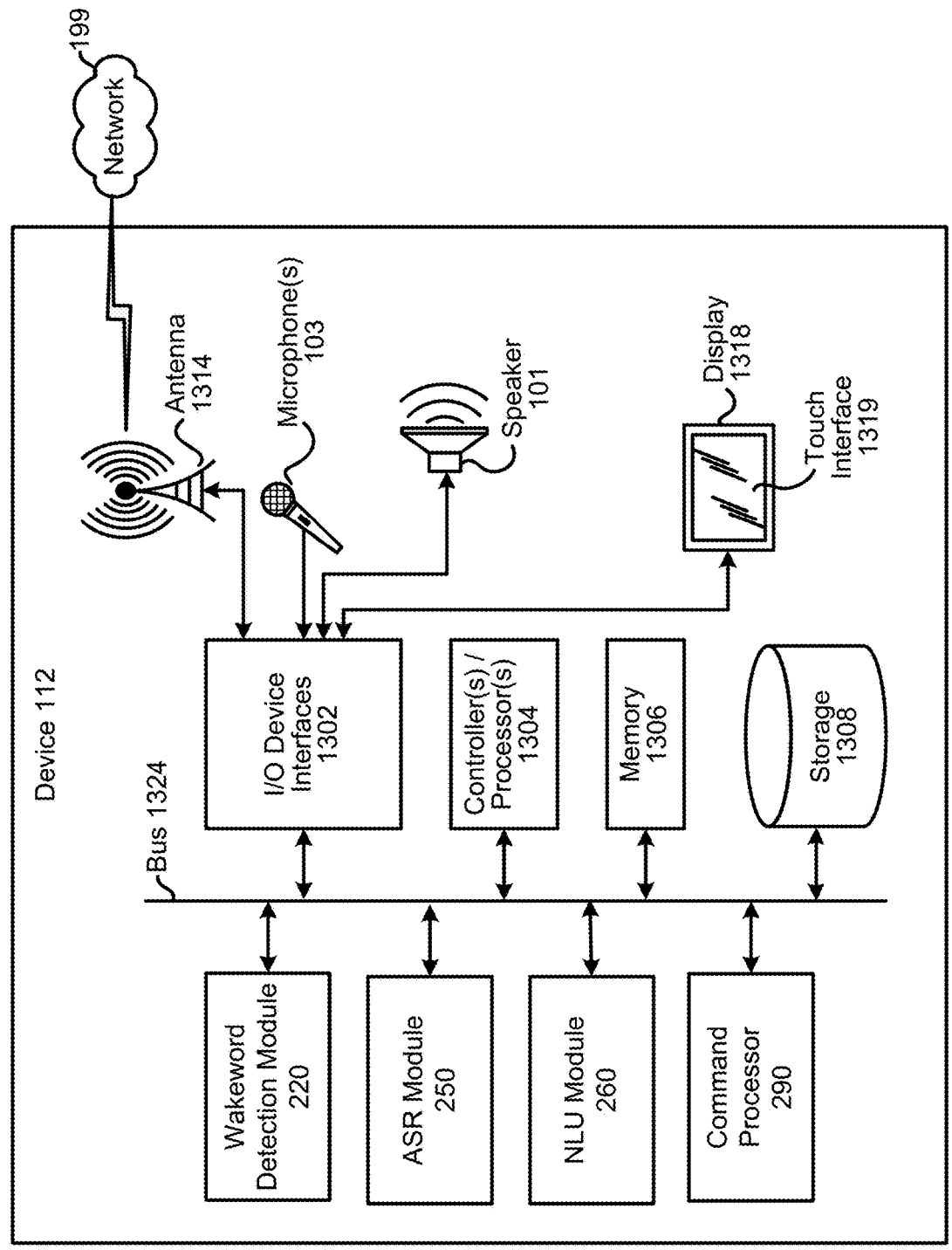

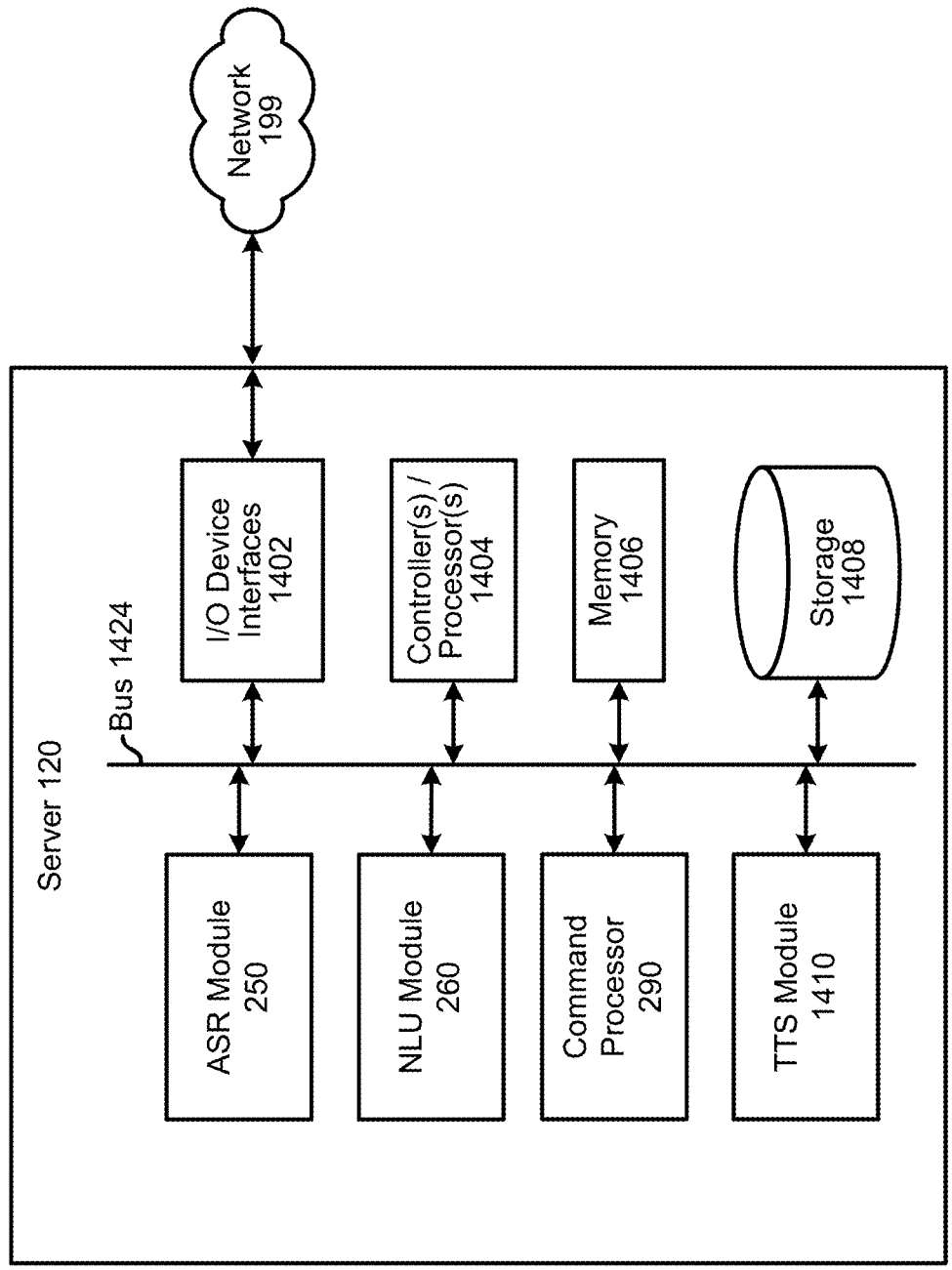

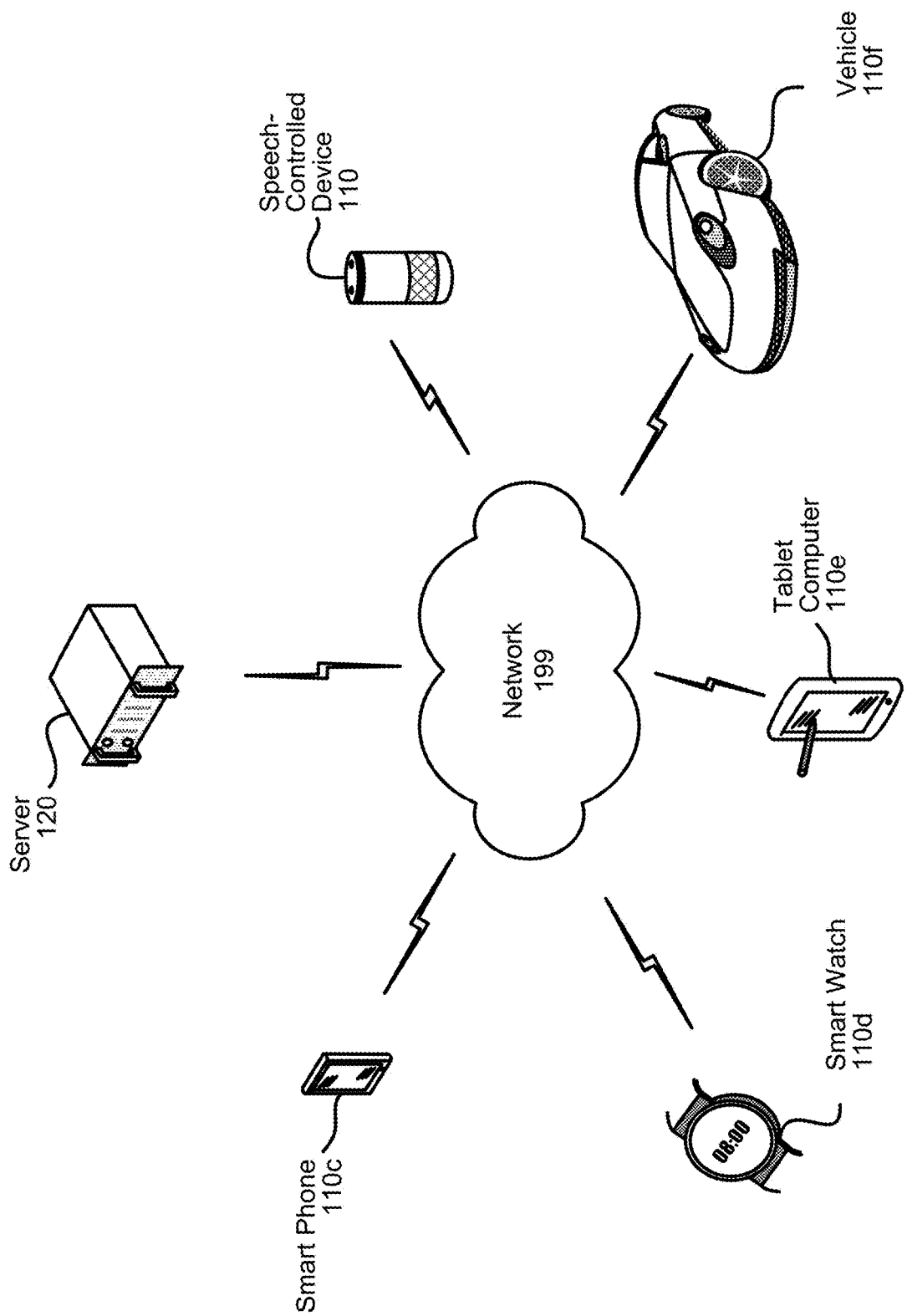

INDICATOR FOR VOICE-BASED COMMUNICATIONS

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system for altering voice-based interactions via speech-controlled devices.

FIG. 4 illustrates data stored and associated with user profiles.

FIGS. 6A and 6B are a signal flow diagram illustrating alteration of voice-based interaction via speech-controlled devices.

FIGS. 8A and 8B are a signal flow diagram illustrating the output of signaling via user interfaces of speech-controlled devices.

FIG. 9 is a signal flow diagram illustrating the output of signaling via user interfaces of speech-controlled devices.

FIGS. 10A through 10C illustrate example signals output to a user via a speech-controlled device.

FIGS. 11A and 11B illustrate an example signal output to a user via a speech-controlled device.

FIG. 13 is a block diagram conceptually illustrating example components of speech-controlled devices according to embodiments of the present disclosure.

FIG. 14 is a block diagram conceptually illustrating example components of a server according to embodiments of the present disclosure.

FIG. 15 illustrates an example of a computer network for use with the system of the present disclosure.

DETAILED DESCRIPTION

Figure 1B:
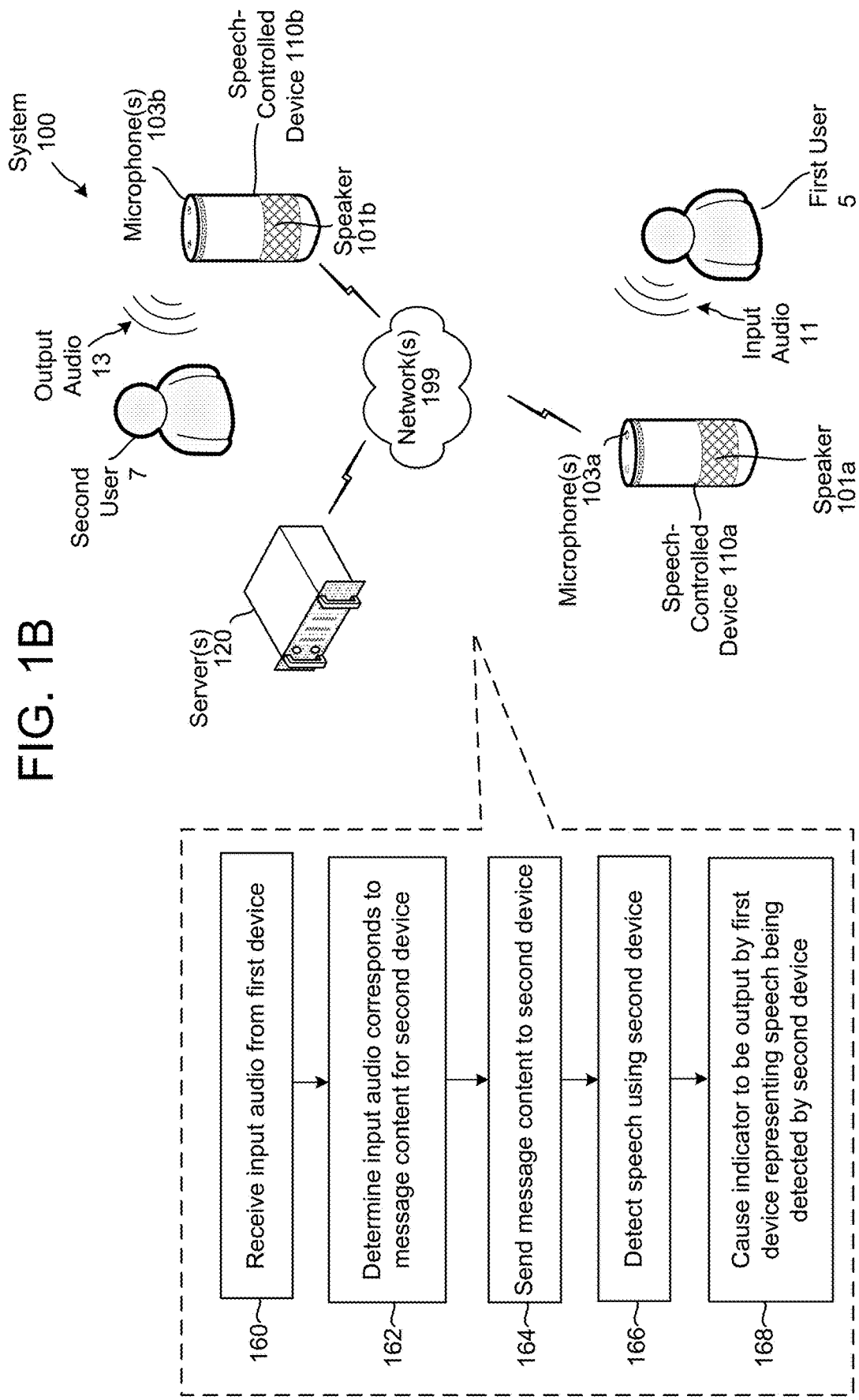
FIG. 1B illustrates a system for outputting signals to a user during messaging via speech-controlled devices.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local or other type of client device having one or more microphones being configured to capture sounds from a user speaking and convert those sounds into an audio signal. The audio signal may then be sent to a remote device for further processing, such as converting the audio signal into an ultimate command. The command may then be executed by a combination of remote and user devices depending on the command itself.

In certain configurations, a speech processing system may be configured to communicate spoken messages between devices. That is, a first device may capture an utterance commanding the system to send a message to a recipient associated with a second device. In response, the user of the second device may speak an utterance that is captured by the second device, and then sent to the system for processing to send a message back to the user of the first device. In this manner a speech controlled system may facilitate spoken messaging between devices.

One drawback to such messaging, however, is that for each spoken interaction with the system, a user may need to speak both a wakeword (to "wake up" a user device) as well as a recipient of the message, so the system knows how to route the message included in the utterance. Such a traditional configuration may add friction to the interaction between the user(s) and the system, particularly when two users are exchanging multiple messages between them.

The present disclosure provides techniques for altering voice-based interactions via speech-controlled devices. Speech-controlled devices capture audio, including wakeword portions and payload portions, for sending to a server to relay messages between speech-controlled devices. In response to determining the occurrence of a communication alteration trigger, such as repeated messages between the same two devices, the system may automatically change a mode of a speech-controlled device, such as no longer requiring a wakeword, no longer requiring an indication of a desired recipient, or automatically connecting the two speech-controlled devices in a voice-chat mode. When the mode of the speech-controlled device is changed, the system may use different protocols to govern how messages and other data are exchanged between devices of the system. For example, when the system switches from exchanging voice messages between devices to initiating a synchronous call (e.g., phone call) between devices, the system may stop using a messaging protocol and activate or invoke a real-time protocol (e.g., a Voice over Internet Protocol (VoIP)). In response to determining the occurrence of further communication altering triggers, the system may initiate a real-time, synchronous call between the speech-controlled devices. Various examples of communication altering triggers and handling by the system are illustrated below. Communication alteration triggers as described herein may be system determined based on the satisfaction of configured thresholds. That is, the system may be configured to alter communication exchanges without receiving an explicit indication from a user to do so.

The present disclosure also provides techniques for outputting visual (or audio, haptic, etc.) indications regarding voice-based interactions. Such an indication may provide feedback using a first device's user interface, the feedback indicating that a second device's input component (e.g., microphone) is in the process of receiving a user input, such as a reply to a message sent from the first user's device. After the server sends message content to a recipient's speech-controlled device, the server may receive an indication from the recipient's speech-controlled device that the device is detecting speech. In response, the server then causes a visual indication to be output by the first speech-controlled device, with the visual indication representing the recipient-speech controlled device is detecting speech. As such, it should be appreciated that the visual indication may be used to keep users of speech-controlled devices from "talking over" each other (i.e., prevent users of the speech-controlled devices from simultaneously speaking messages).

FIG. 1A shows a system 100 configured to alter voice-based interactions between speech-controlled devices. Although FIG. 1A, and lower figures/discussion, illustrate the operation of the system 100 in a particular order, the steps described may be performed in a different order (as well as certain steps removed or added) without departing from the intent of the disclosure. As shown in FIG. 1A, the system 100 may include one or more speech-controlled devices 110a and 110b local to a first user 5 and a second user 7, respectively. The system 100 also includes one or more networks 199 and one or more servers 120 connected to the devices 110a and 110b across network(s) 199. The server(s) 120 (which may be one or more different physical devices) may be capable of performing traditional speech processing (such as ASR, NLU, query parsing, etc.) as described herein. A single server may be capable of performing all speech processing or multiple servers may combine to perform the speech processing. Further, the server(s) 120 may be configured to execute certain commands, such as answering queries spoken by the first user 5 and/or second user 7. In addition, certain speech detection or command execution functions may be performed by the devices 110a and 110b.

As shown in FIG. 1A, the user 5 may speak an utterance (represented by input audio 11). The input audio 11 may be captured by one or more microphones 103a of the device 110a and/or a microphone array (not illustrated) separated from the device 110a. The microphone array may be connected to the device 110a such that when the input audio 11 is received by the microphone array, the microphone array sends audio data corresponding to the input audio 11 to the device 110a. Alternatively, the microphone array may be connected to a companion application of a mobile computing device (not illustrated), such as a smart phone, tablet, etc. In this example, when the microphone array captures the input audio 11, the microphone array sends audio data corresponding to the input audio 11 to the companion application, which forwards the audio data to the device 110a. If the device 110a captures the input audio 11, the device 110a may convert the input audio 11 into audio data and send the audio data to the server(s) 120. Alternatively, if the device 110a receives audio data corresponding to the input audio 11 from the microphone array or companion application, the device 110a may simply forward the received audio data to the server(s) 120.

The server(s) 120 originally communicates messages between speech-controlled devices in response to receiving (150) audio data including a wakeword portion and a payload portion. The payload portion may include recipient information and message content. Communication of the messages as such may occur through use of a message domain and associated protocol(s) as described in detail herein. The server 120 communicates messages as such until the server 120 determines (152) the occurrence of a first communication alteration trigger. Illustrative communication alternation triggers include whether a threshold number of message exchanges between the first speech-controlled device 110a and the second speech-controlled device 110b is met or exceeded, a threshold number of message exchanges occurring with a threshold amount of time, or users of both of the speech-controlled devices 110a/110b simultaneously being with threshold distances of their respective device. After determining the occurrence of the first communication alteration trigger, the server 120 then communicates (154) messages between the same speech-controlled devices in response to receiving audio data including payload data (e.g., message content data). Communication of messages may occur through use of a messaging domain and associated protocol(s) as described in detail herein. The server 120 communicates messages using the messaging domain until the server 120 determines (156) the occurrence of a second communication alteration trigger. After determining the occurrence of the second communication alteration trigger, the server 120 then initiates (158) a real-time call between the speech-controlled devices. Initiating the real-time call may involve use of a real-time call domain and associated real-time protocol(s) as described in detail herein. A real-time communication session/call may involve the passing of audio data between devices as the audio data is received (within operational parameters).

Alternatively, after determination (152) of the first communication alteration trigger, the server 120 may go straight to initiating (158) the real-time call. This may occur under different configured circumstances, such as when the communication alteration trigger is premised upon a certain recipient. For example, a user profile associated with the originating speech-controlled device 110a may indicate that communications with "mom" are to occur via real-time calls. Thus, if the original message is intended for "mom," the server 120 may facilitate a real-time call in response to determining the recipient of the first message is "mom."

According to various embodiments, the server 120 may cause one or both of the speech-controlled devices to output visual indications using respective device user interfaces, with the visual indications representing which domain is being used to exchange communications/messages. For example, a light on the speech-controlled device may emit a blue color when a wakeword is needed, may emit a green color when a wakeword is no longer needed, and may emit a yellow color when the real-time call is facilitated.

In addition to altering voice-based exchanges to voice-based calls as described herein above, the above teachings may be used in the context of video communications. For example, if two individuals are exchanging video messages, the techniques herein described may be used to alter the exchange of video messages to a video call. In another example, if individuals are determined to be in fields of views of cameras while exchanging voice-based messages, the system may be configured to alter the communications to a video call based on the individuals being in the cameras' fields of view. Thus, teachings below regarding detecting speech, capturing audio, or the like may also be applied to detecting video, capturing video, or the like.

Each speech-controlled device may have more than one user. The system 100 may use voice-based speaker IDs or user IDs to identify a speaker of captured audio. Each speaker ID or user ID may be a voice signature that enables the system to determine the user of the device that is speaking. This is beneficial because it allows the system to alter communications as described herein when communication alteration triggers involve a single user of a device. The speaker ID or user ID may be used to determine who is speaking and automatically identify the speaker's user profile for purposes of subsequent processing. For example, if a first user of a device speaks a message, and thereafter a second user of the device speaks a message, the system is able to distinguish the two users based on voice signature, thereby preventing the system from determining a single communication alteration trigger based on the messages spoken by different users.

FIG. 1B illustrates a system for outputting signals, via device user interfaces, during messaging to indicate that responsive speech is being detected by a recipient's device. As shown in FIG. 1B, the system receives (160) input audio from a first speech-controlled device 110a. The system then determines (162) that the input audio corresponds to message content for the second speech-controlled device 110b. The system then sends (164) the message content to the second speech-controlled device 110b. The system then detects (166) speech using the second speech-controlled device 110b and causes (168) an indicator to be output by the first speech-controlled device 110a, where the indicator represents speech is being detected by the second device, where the speech may be in response to the message content, and thus notifies a user of the first speech-controlled device 110a that a reply may be imminent. The indicator may be visual, audible, or haptic. In an example, the indicator may be visual for a video enabled device.

Figure 2:
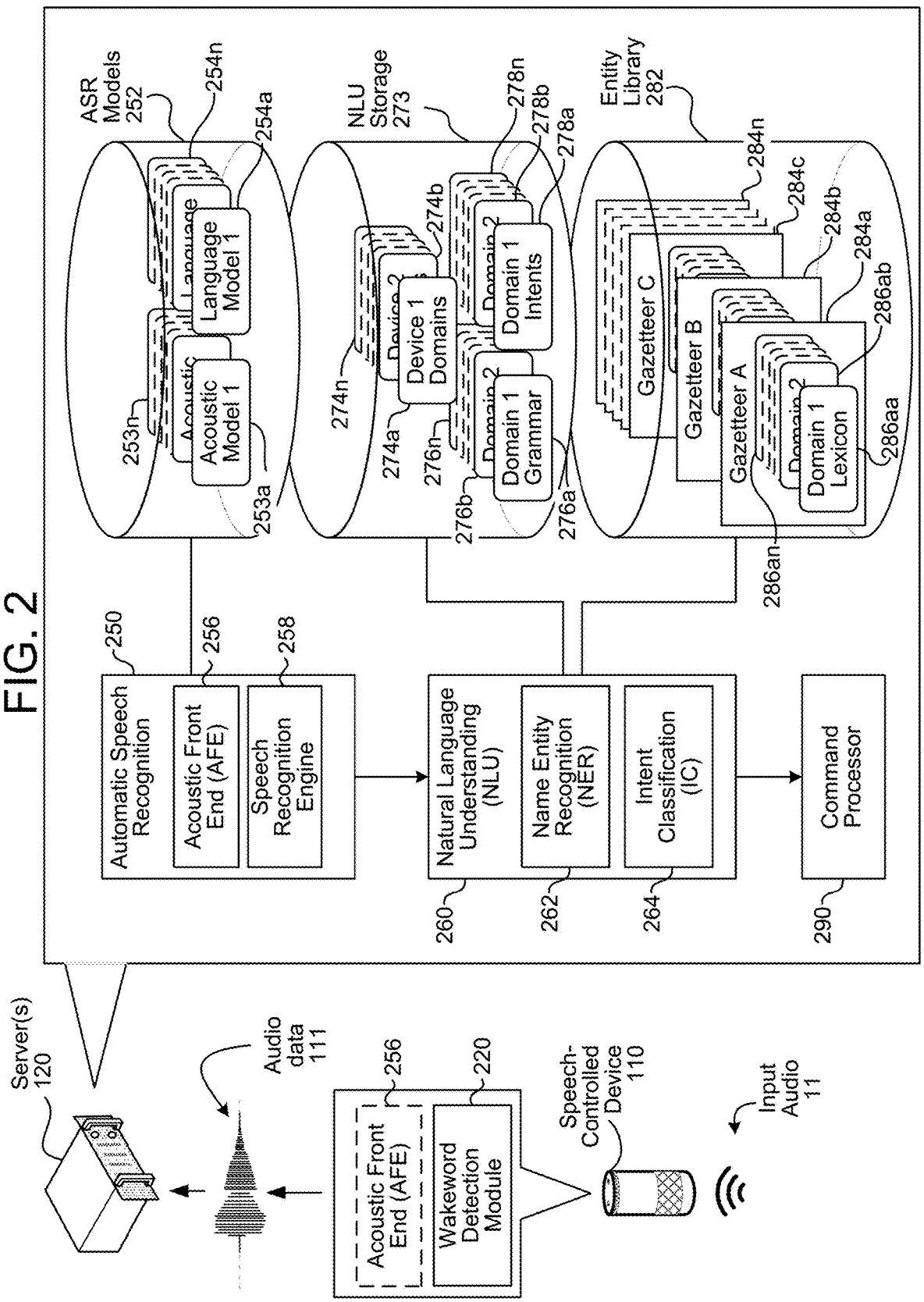
FIG. 2 is a conceptual diagram of a speech processing system.

Further details of escalating a voice-based interaction are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone 103 of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device 110, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the user device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the user device 110 prior to sending. Further, a user device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and NLU storage 273. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse, tag, and annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}:

"Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazetteer for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
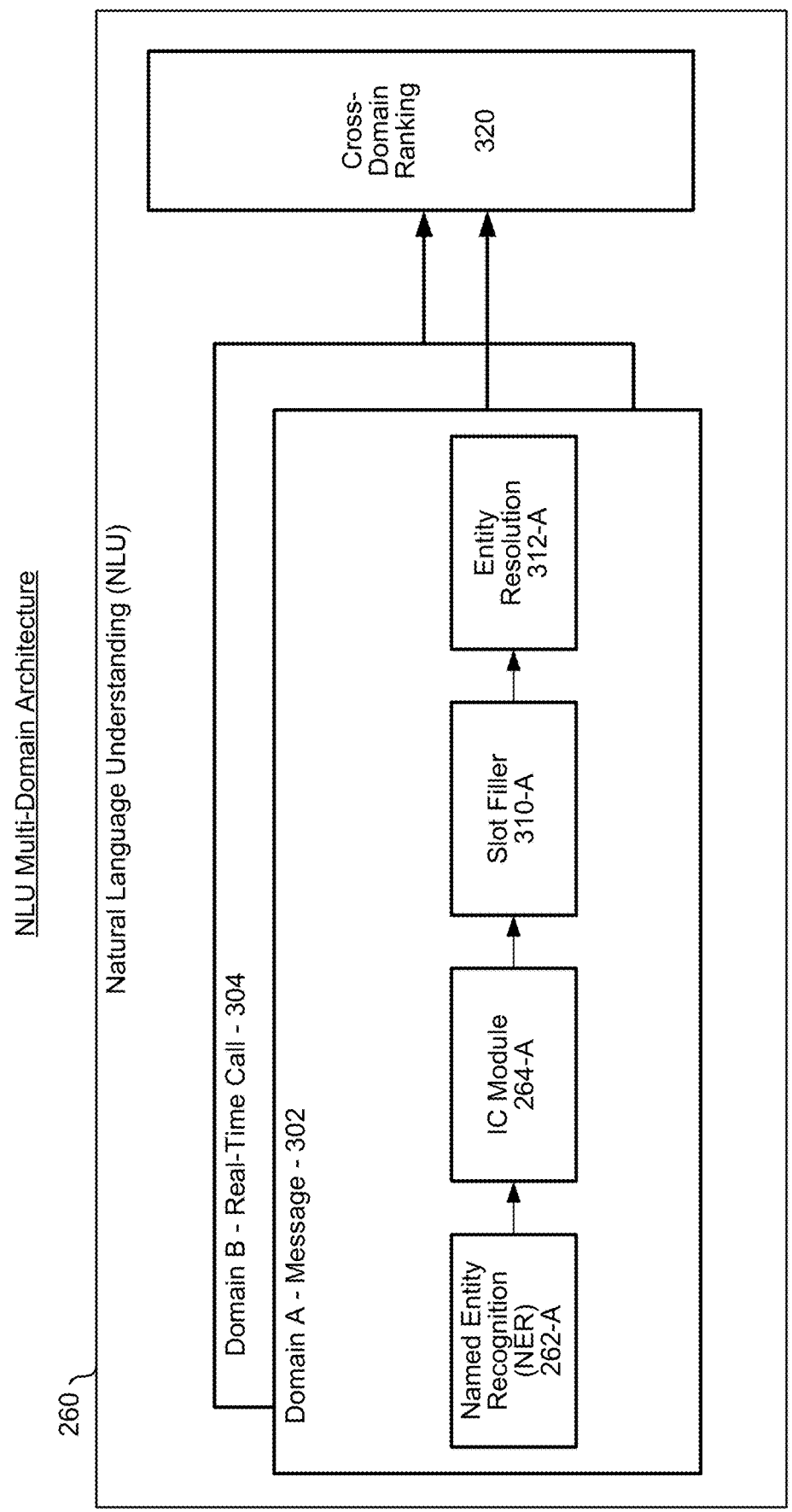
FIG. 3 is a conceptual diagram of a multi-domain architecture approach to natural language understanding.

The NLU operations of the system described herein may take the form of a multi-domain architecture, such as that illustrated in FIG. 3. In the multi-domain architecture, each domain (which may include a set of intents and entity slots that define a larger concept such as music, books etc.) is constructed separately and made available to the NLU component 260 during runtime operations where NLU operations are performed on text (such as text output from the ASR component 250). Each domain may have specially configured components to perform various steps of the NLU operations. For example, a message domain 302 (Domain A) may have an NER component 262-A that identifies what slots (i.e., portions of input text) may correspond to particular entities relevant to that domain. The NER component 262-A may use a machine learning model, such as a domain specific conditional random field (CRF) to both identify the portions corresponding to an entity as well as identify what type of entity corresponds to the text portion. For example, for the text "tell John Smith I said hello," an NER 262-A trained for the message domain 302 may recognize the portion of text [John Smith] corresponds to an entity. The message domain 302 may also have its own intent classification (IC) component 264-A that determines the intent of the text assuming that the text is within the proscribed domain. The IC component may use a model, such as a domain specific maximum entropy classifier to identify the intent of the text. The message domain 302 may also have its own slot filling component 310-A that can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The message domain 302 may also have its own entity resolution component 312-A that can refer to an authority source (such as a domain specific knowledge base) that is used to specifically identify the precise entity referred to in the entity mention identified in the incoming text. Specific intent/slot combinations may also be tied to a particular source, which may then be used to resolve the text (such as by providing information or a command to be executed in response to a user query). The output from the entity resolution component 312-A may include a command, information, or other NLU result data indicating how the domain specific NLU processing handled the text and how the system should respond to the text, according to that specific domain.

As illustrated in FIG. 3, multiple domains may operate substantially in parallel, with different domain specific components. Moreover, each domain may implement certain protocols when exchanging messages or other communications. That is, domain B, for real-time calls, 304 may have its own NER component 262-B, IC module 264-B, slot filling component 310-B, and entity resolution component 312-B. The system may including additional domains not herein described. The same text that is input into the NLU pipeline for domain A 302 may also be input into the NLU pipeline for domain B 304, where the components for domain B 304 will operate on the text as if the text related to domain B, and so on for the different NLU pipelines for the different domains. Each domain specific NLU pipeline will create its own domain specific NLU results, for example NLU results A (for domain A), NLU results B (for domain B), NLU results C (for domain C), and so on.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions.

The server 120 may also include data regarding user accounts, shown by the user profile storage 402 illustrated in FIG. 4. The user profile storage may be located proximate to server 120, or may otherwise be in communication with various components, for example over network 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names of users and locations of the devices. The user profile storage may additionally include communication alteration triggers specific to each device, indication preferences for each device, etc. In an example, the type of indication to be output by each device may not be stored in a user profile. Rather, the type of indication may be dependent upon context. For example, if video messages are being exchanged by the system, the indication may be visual. For further example, if audio messages are being exchanged by the system, the indication may be audible.

Each user profile may store one or more communication alteration paths. Moreover, each communication alteration path may include a single communication alteration trigger or multiple communication alteration triggers that represent when communication alteration should occur. It should be appreciated that N number of communication alteration paths having M number of communication alteration triggers may be stored in a single user profile. Each communication alteration path may be unique to a different individual with which the user communicates. For example, one communication alteration path may be used when the user communicates with its mom, another communication alteration path may be used when the user communicates with its spouse, etc. Each communication alteration path may also be unique to a type of communication (e.g., audio messaging, video messaging, etc.). Each communication alteration path may also be unique to the type of device(s) involved in the communication. For example, a user may have a first communication alteration path configured for a device in the user's car, a second communication alteration path configured for a device in the user's bedroom, etc.

Some or all of the communication alteration paths of a user profile may be dynamic. That is the communication alteration paths may depend upon external signals. An illustrative external signal includes proximity to a device. For example, one communication alteration path may be used when communicating with the user's mom while the user's mom is not proximate to her device, and a second communication alteration path may be used when communicating with the user's mom while the user's mom is proximate to her device. For example, a speech-controlled device 110 may capture one or more images, and send image data corresponding thereto to the server 120. The server 120 may determine the image data includes a representation of a human. The server 120, may also determine a proximity of the human to the device 110 based on a location of the representation of the human in the image data. Dynamic choosing of communication alteration paths may also be influenced by machine learning. For example, a communication alteration path may be configured to alter communications to real-time calls when the user is communicating with its mom after a certain time at night. The system may then determine that a certain percentage of the time, the user alters the communication within a threshold amount of time. Based on this determination, the system may suggest the user revise/update the communication alteration path to not alter messaging to real-time calls so quickly.

Each communication escalation path may include one or more communication alterations. One type of communication alteration involves removing the need for a wakeword portion so spoken audio only needs to include a command (e.g., language causing the system to send a message) and message content. A second type of communication alteration involves removing the need for a wakeword portion and a command so spoken audio only needs to include message content. A third type of communication alteration involves replacing a default wakeword, and make the wakeword the name of the recipient of the message (e.g., mom, John, etc.). A fourth type of communication alteration is altering a message exchange to a real-time call.

FIGS. 5A through 5D illustrate the alteration of voice-based interactions via speech-controlled devices. A first speech-controlled device 110a captures spoken audio including a wakeword portion and a payload portion (illustrated as 502). For example, the speech-controlled device 110a may be in a sleep mode until detection of a spoken wakeword, which triggers the speech-controlled device 110a to wake and capture audio (which may include the spoken wakeword and speech thereafter) for processing and sending to the server 120. The speech-controlled device 110a sends audio data corresponding to the captured spoken audio to the server 120 (illustrated as 504).

The server 120 performs ASR on the received audio data to determine text (illustrated as 506). The server 120 may determine the wakeword portion and the payload portion of the text, and perform NLU on the payload portion (illustrated as 508). Performing NLU processing may include the server 120 tagging recipient information of the payload portion (illustrated as 510), tagging message content information of the payload portion (illustrated as 512), and tagging the overall payload portion with a "send message" intent tag (illustrated as 514). For example, the payload portion of the received audio data may correspond to text of "tell John Smith I said hello." According to this example, the server 120 may tag "John Smith" as recipient information, may tag "hello" as message content information, and may tag the utterance with the "send message" intent tag. Tagging the payload portion with the message intent tag may be performed using the message domain 302 and/or may cause the system to perform further messaging commands, such as with a messaging command processor 290.

Figure 5A:
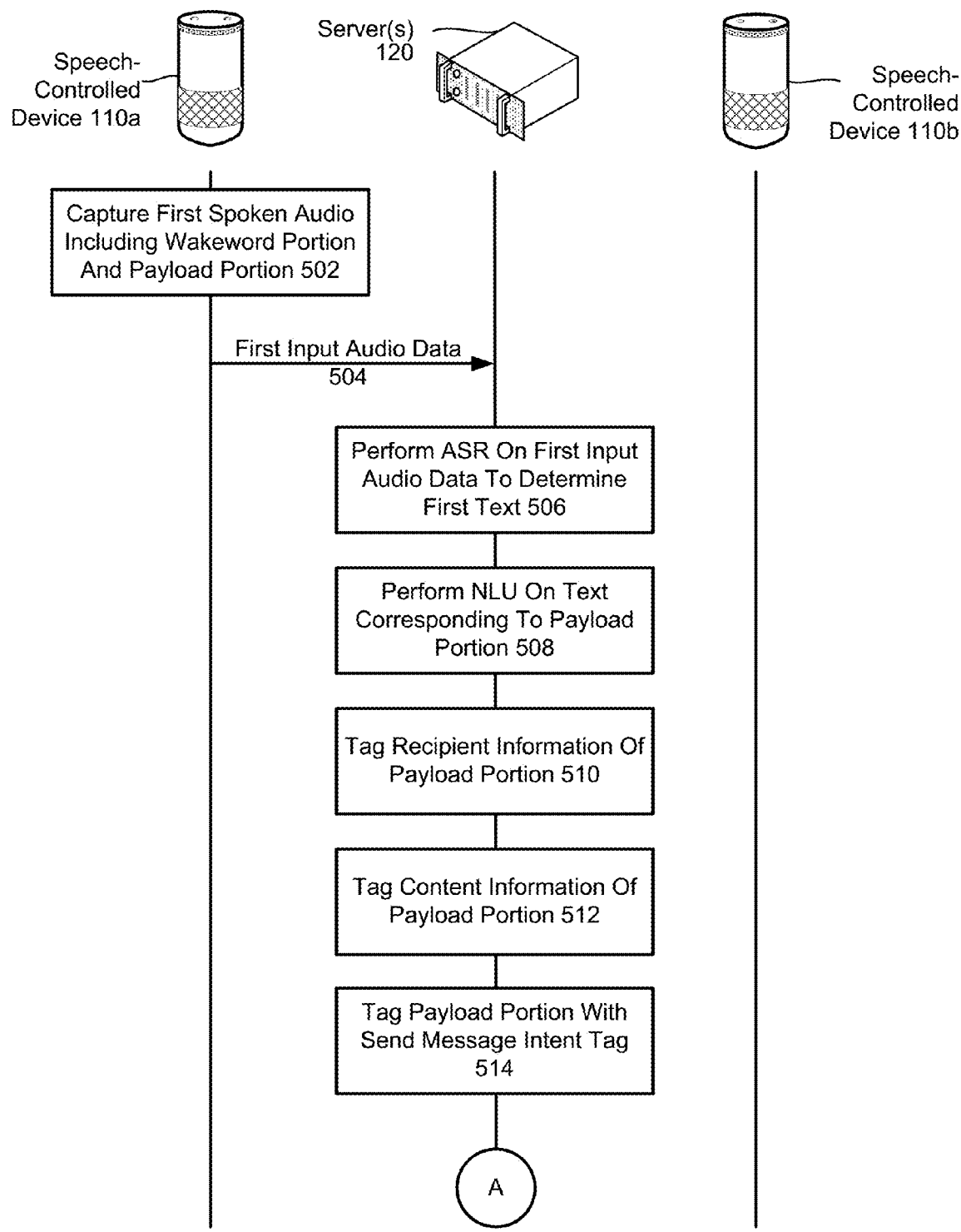
FIGS. 5A through 5D are a signal flow diagram illustrating alteration of voice-based interaction via speech-controlled devices.
Figure 5B:
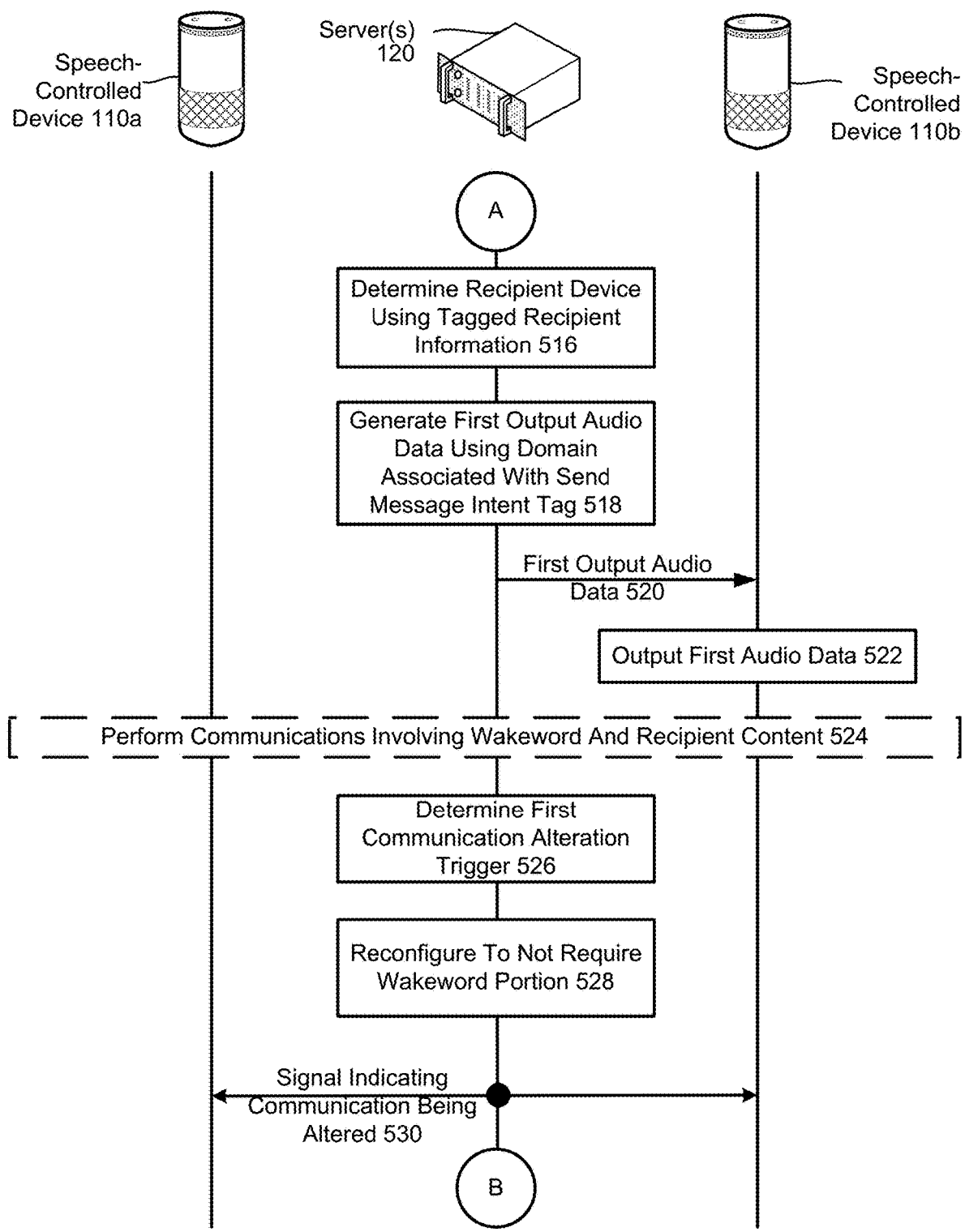

Using the tagged recipient information, the server 120 determines a device associated with the recipient (e.g., the speech-controlled device 110b) (illustrated as 516 in FIG. 5B). To determine the recipient device, the server 120 may use a user profile associated with the speech-controlled device 110a and/or the user that spoke the initial audio. For example, the server 120 may access a table of the user profile to match text in the table corresponding to the tagged recipient information (i.e., "John Smith"). Once matching text is identified, the server 120 may identify the recipient device associated with the matching text in the table.

The server 120 also generates output audio data using a domain and associated protocol(s) of the server 120 associated with the "send message" intent tag (illustrated as 518). The output audio data may include the spoken audio received from the speech-controlled device 110*a*. Alternatively, the output audio data may include computer-generated, text-to-speech (TTS) audio data based on the text of the message content received from the speech-controlled device 110*a*. The server 120 sends the output audio data to the recipient device (illustrated as 520), which outputs audio data to the recipient (illustrated as 522). In an example, the speech-controlled device 110*b* of the recipient may not output the audio data until it detects a command from the recipient to do so. Such a command may be a spoken utterance of the recipient corresponding to "What are my messages?", "Do I have any messages?", etc.

The server 120 performs message communications between the first speech-controlled device 110*a* and the second speech-controlled device 110*b* as detailed herein above with respect to steps 502-522 of FIGS. 5A and 5B (e.g., via the message domain) (illustrated as 524), until the server 120 determines the occurrence of a communication alteration trigger (illustrated as 526). A communication alteration trigger may cause the server 120 to perform subsequent communications/processes using another domain and corresponding protocol(s), different from the domain used to perform previous communications/processes. Alternatively, the system may adjust the processing of future messages to not require certain spoken data (such as a wakeword or indication of a recipient). The determined communication alteration trigger may take on many forms. The communication alteration trigger may be based on whether a threshold number of message exchanges between the first speech-controlled device 110*a* and the second speech-controlled device 110*b* is met or exceeded. For example, the threshold number of message exchanges may be set by a user of either of the speech-controlled devices 110*a*/110*b*, and may be represented in a respective user profile. It should be appreciated that the threshold number of message exchanges associated with a user profile of the first speech-controlled device 110*a* may be different from the threshold number of message exchanges associated with a user profile of the second speech-controlled device 110*b*. In this instance, the threshold used by the server 120 to determine when communication alteration should occur may be the threshold that is met or exceeded first (i.e., the threshold having a less number of required message exchanges). The communication alteration trigger may also or alternatively be based on a threshold number of message exchanges occurring with a threshold amount of time. For example, the threshold number of message exchanges and/or the threshold amount of time may be set by a user of either of the speech-controlled devices 110*a*/110*b*, and may be represented in a respective user profile. It should be appreciated that the threshold number of message exchanges and the threshold amount of time associated with a user profile of the first speech-controlled device 110*a* may be different from the threshold number of message exchanges associated with a user profile of the second speech-controlled device 110*b*. In this instance, the thresholds used by the server 120 to determine when communication alteration should occur may be the threshold that is met or exceeded first. The communication alteration trigger may also or alternatively be based on users of both of the speech-controlled devices 110*a*/110*b* simultaneously being with threshold distances of their respective device. It should be appreciated that communication alteration may occur based on the satisfaction of a single communication alteration trigger. It should also be appreciated that communication alteration may occur based on satisfaction of more than one communication alteration trigger.

Once one or more communication alteration triggers are determined, depending upon implementation, the server 120 reconfigures utterances from the first/second speech-controlled device to not require presence of a wakeword portion or recipient information in received audio data (illustrated as 528). This may be done using the message domain 302 and associated protocol(s), for example. In addition, the reconfiguration that occurs at step 528 may instruct the speech-controlled device 110*b* to output a received communication without first detecting speech corresponding to a command to do so. Further, the server 120 may send a signal to one or both of the speech-controlled devices 110*a*/110*b* indicating the communication between the first and second speech-controlled devices 110*a*/110*b* is being altered (illustrated as 530). A speech-controlled device may output an indication representing the device is "listening" in an attempt to capture message content. In addition, a speech-controlled device may output an indication representing a recipient's device is capturing spoken message content. The speech-controlled device 110*a* and/or the speech-controlled device 110*b* may then output a signal representing that wakeword audio is no longer required (illustrated as 532 in FIG. 5C). The signal output by one or both of the speech-controlled devices 110*a*/110*b* may be a static indication or motion indication as described herein below.

Thereafter, the speech-controlled device 110*a* captures spoken audio from a user including only payload information (illustrated as 534), and sends audio data corresponding to the payload information to the server 120 (illustrated as 536). The server 120 performs ASR on the received audio data to determine text (illustrated as 538), and performs NLU processing on the payload information text (illustrated as 540). Performing NLU processing may include the server 120 tagging recipient information of the payload information text, tagging message content information of the payload information text, and tagging the overall payload information text with an instant message intent tag. For example, the payload information of the received audio data may state "When will you be done with the project?" According to this example, the server 120 may tag "when will you be done with the project" as message content information, and may tag the utterance with a "send instant message" intent tag. Tagging the payload information text with the message intent tag may cause the server 120 to perform downstream processes using the message domain 302. By not requiring recipient information to be present in the input audio, the server 120 may assume the recipient device is the same as the recipient device used in previous communications, thereby negating the need of the server 120 to again determine the recipient device.

The server 120 generates output audio data using a domain and associated protocol(s) of the server 120 associated with the "send instant message" intent tag (illustrated as 542). For example, the message domain 302 may be associated with the instant message intent tag. The output audio data may include the spoken audio received from the speech-controlled device 110*a*. Alternatively, the output audio data may include computer-generated, text-to-speech (TTS) audio data based on the spoken audio received from the speech-controlled device 110*a*. The server 120 sends the output audio data to the recipient device (i.e., the speech-controlled device 110*b*) (illustrated as 544), which outputs audio of the audio data to the recipient (illustrated as 546 in FIG. 5D). As detailed above, the reconfiguration that occurs at step 528 may instruct speech-controlled device 110*b* to output a received communication without first receiving a command from a user to do so. As such, it should be appreciated that the speech-controlled device 110*b* may output the audio data to the recipient at step 546 without first receiving a command to do so. That is, the speech-controlled device 110*b* may auto-play the audio data.

Figure 5C:
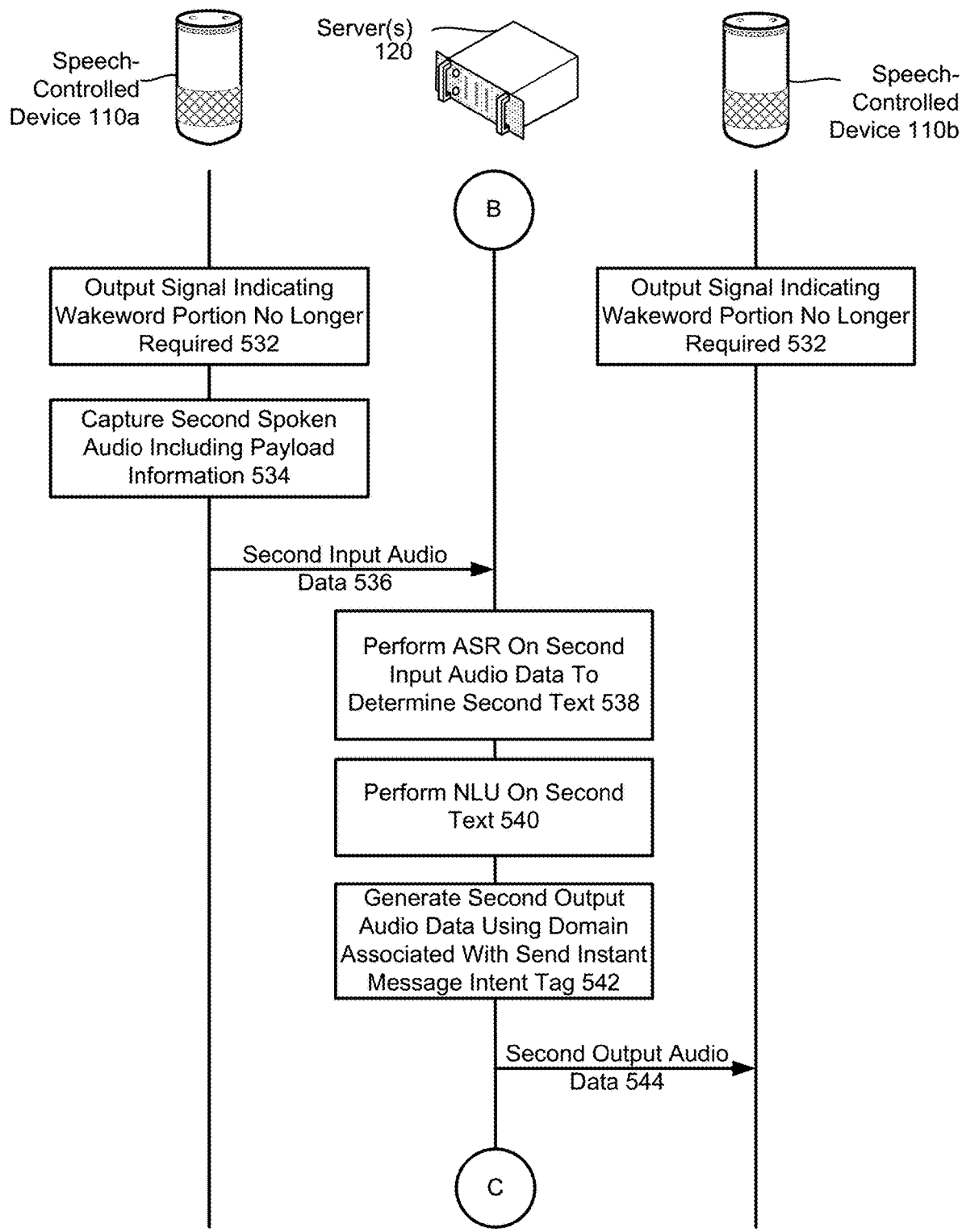
Figure 5D:
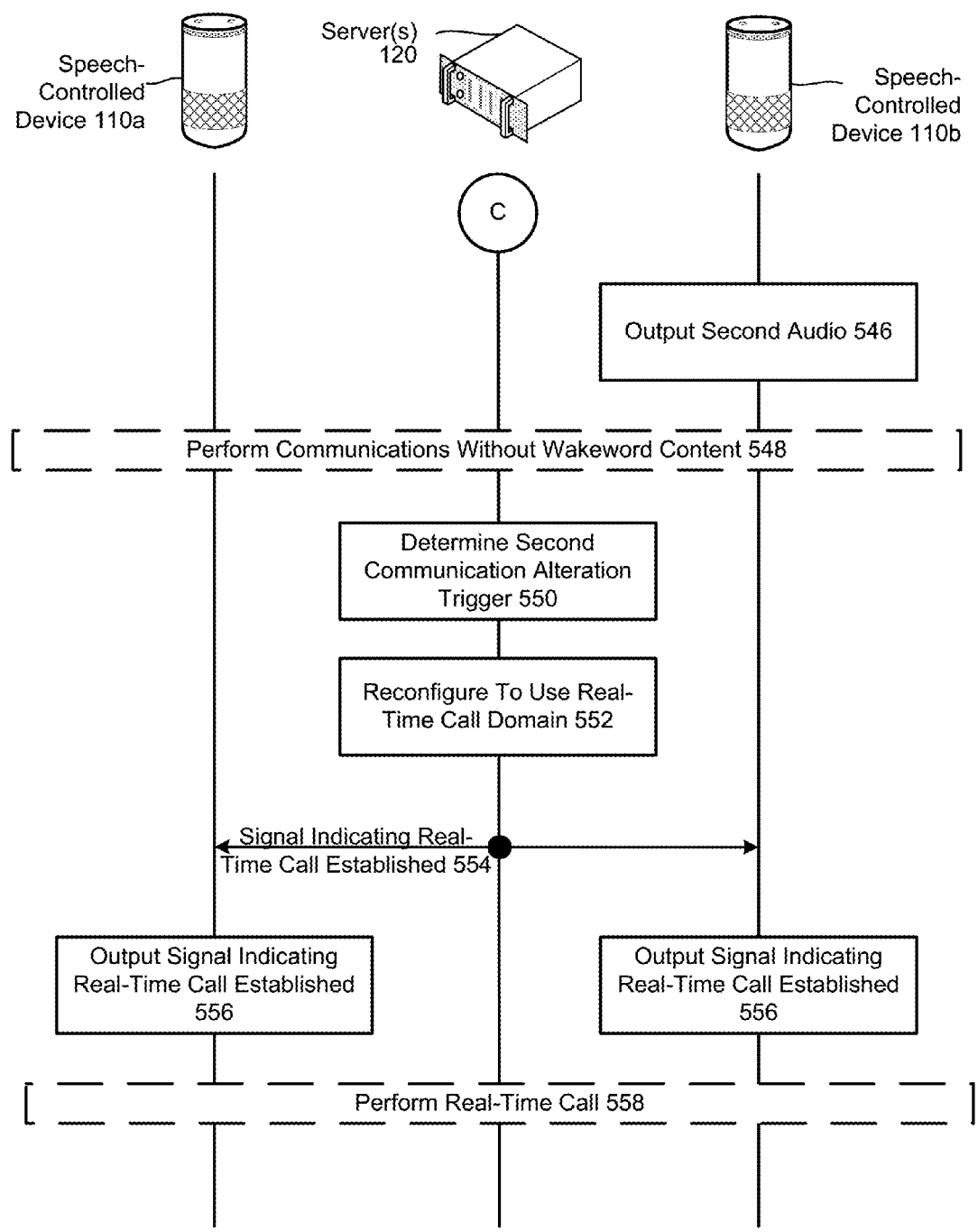

The server 120 performs instant message communications between the first speech-controlled device 110*a* and the second speech-controlled device 110*b* as detailed herein above with respect to steps 534-546 of FIGS. 5C through 5D (e.g., via the instant message domain and without requiring wakeword audio data) (illustrated as 548), until the server 120 determines the occurrence of another communication alteration trigger (illustrated as 550). The second determined communication alteration trigger may take on many forms. Like the first communication alteration trigger, the second communication alteration trigger may be based on whether a threshold number of message exchanges between the first speech-controlled device 110*a* and the second speech-controlled device 110*b* is met or exceeded, based on a threshold number of message exchanges occurring with a threshold amount of time, and/or based on users of both of the speech-controlled devices 110*a*/110*b* simultaneously being with threshold distances of their respective device. The thresholds used in determining the first and second communication alteration triggers may be the same (e.g., each requires 5 message exchanges) or different (e.g., the first communication alteration occurs after 5 message exchanges using the message domain 302 and the second communication alteration occurs after 7 message exchanges using the message domain 302). The message exchanges for each communication alteration trigger may be determined using a single counter that does not reset after the first communication alteration. According to the previous example, the first communication alteration may occur after the counter reaches 5 message exchanges (i.e., 5 message exchanges using the message domain 302) and the second communication alteration may occur after the counter reaches 12 message exchanges (i.e., 7 message exchanges using the message domain 302). Alternatively, the message exchanges for each communication alteration may be determined using different counters, or a single counter that resets after the first communication alteration. According to the previous example, the first communication alteration may occur after the counter reaches 5 message exchanges (i.e., 5 message exchanges using the message domain 302), the counter may then reset to zero, and the second communication alteration may occur after the counter reaches 7 message exchanges (i.e., 7 message exchanges using the message domain 302). The threshold distances to the speech-controlled devices 110*a*/110*b* within which users need to be for the first and second communication alterations may be the same or different. Moreover, like the first communication alteration, the second communication alteration may occur based on satisfaction of a single communication alteration trigger, or more than one communication alteration trigger.

Once the second communication alteration trigger(s) is determined, depending upon implementation, the server 120 reconfigures to use a domain and associated protocol(s) that establishes a real-time call between the speech-controlled device 110*a* and the speech-controlled device 110*b* (illustrated as 552). Such a domain may be the real-time call domain 304, for example. A real-time call, as used herein, refers to a call that is facilitated between the speech-controlled devices 110*a*/110*b* via the server 120, where a direct communication channel may be opened between the speech controlled devices. For example, during a real-time call, the system may send audio data from the first speech-controlled device 110*a* to the second speech-controlled device 110*b* without performing speech processing (such as ASR or NLU) on the audio data, thus enabling the user of the first speech-controlled device 110*a* to "speak directly" with the user of the second speech-controlled device 110*b*. Alternatively, the system may perform speech processing (such as ASR or NLU) but absent a command intended for the system, may pass the audio data back and forth between the devices 110*a*/110*b*. A real-time call can be ended, for example, as discussed below in reference to FIG. 7.

The server 120 may send a signal to one or both of the speech-controlled devices 110*a*/110*b* indicating a real-time call is established (illustrated as 554). The speech-controlled device 110*a* and/or the speech-controlled device 110*b* then outputs a signal representing the user can speak as if s/he were conducting a point-to-point call (illustrated as 556). A real-time or point-to-point call/communication, as used herein, refers to a call that is facilitated between the speech-controlled devices 110*a*/110*b* via the server 120. That is, a real-time call or point-to-point call is a communication where audio is simply captured by a device, sent as audio data to the server, and the server merely sends the received audio data to a recipient device, with the recipient device outputting audio without first receiving a command to do so. The signal output by one or both of the speech-controlled devices 110*a*/110*b* may be a static indication or motion indication as described herein below. The system then performs the real-time communication session (illustrated as 558). The real-time communication session may be performed by the system until a de-escalation trigger (as detailed herein) is determined.

When performing communications between the speech-controlled devices, the system may use various types of protocols that control data size, transmission speed, etc. For example, a first protocol may be used to control the exchange of communications that require the presence of a wakeword portion and recipient content. A second protocol may be used to control the exchange of communications that do not require a wakeword portion, but still require recipient content. A third protocol may be used to control the exchange of communications that do not contain NLU intent. That is, the third protocol may be used when neither a wakeword portion nor recipient content is required, as the system presumes the recipient based on past contemporaneous message exchanges. A real-time protocol, such as a VoIP, may be used when a synchronous call between speech-controlled devices is performed.

Figure 6A:
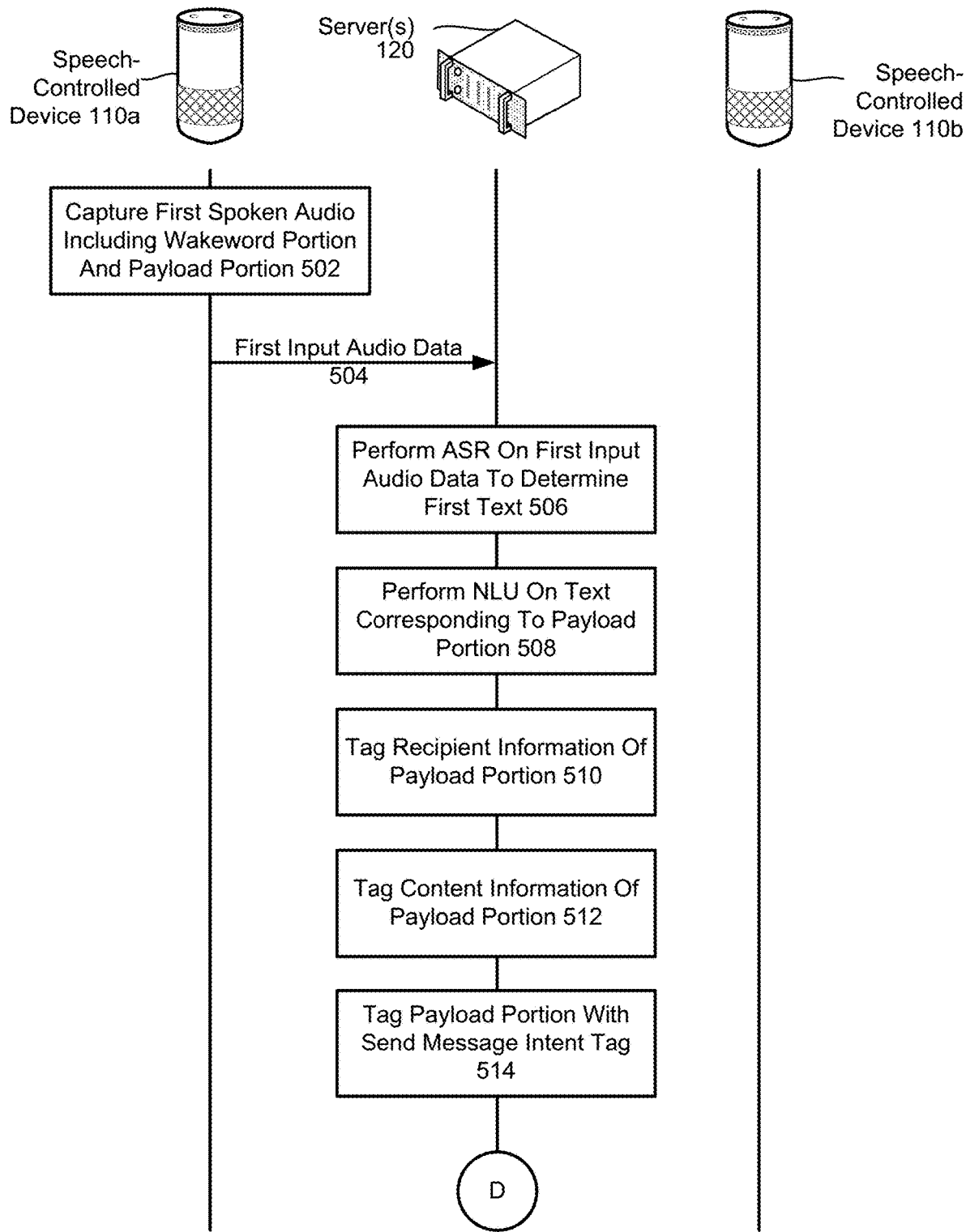

FIGS. 6A and 6B illustrate alteration of voice-based interactions via speech-controlled devices based on the intended recipient of the message. The first speech-controlled device 110*a* captures spoken audio including a wakeword portion and a payload portion (illustrated as 502). For example, the speech-controlled device 110*a* may be in a sleep mode until detection of a spoken wakeword, which triggers the speech-controlled device 110*a* to wake and capture audio including the spoken wakeword and speech thereafter. The speech-controlled device 110*a* sends audio data corresponding to the captured spoken audio to the server 120 (illustrated as 504).

The server 120 performs ASR on the received audio data to determine text (illustrated as 506). The server 120 determines the wakeword portion and the payload portion of the text, and performs NLU on the payload portion (illustrated as 508). Performing NLU processing may include the server 120 tagging recipient information of the payload portion (illustrated as 510), tagging message content information of the payload portion (illustrated as 512), and tagging the overall payload portion with a "send message" intent tag (illustrated as 514). For example, the payload portion of the received audio data may state "tell mom I said I will be there soon." According to this example, the server 120 may tag "mom" as recipient information, may tag "I will be there soon" as message content information, and may associate the utterance with the "send message" intent tag. As detailed herein above, communication alteration paths and communication alteration triggers may be configurable via user profiles. According to this embodiment, the server 120 may determine communication alteration based on the intended recipient of the message. For example, the server 120, using the tagged recipient information, may access a user profile of the speech-controlled device 110*a* and determine a communication alteration path that indicates communications with "mom" are to be performed via real-time calls (illustrated as 602 in FIG. 6B). Thereafter, the server 120 reconfigures to use a domain and associated protocol(s) that establishes a real-time call between the speech-controlled device 110*a* and the speech-controlled device 110*b* (illustrated as 552). Such a domain may be the real-time call domain 304, for example. The server 120 may send a signal to one or both of the speech-controlled devices 110*a*/110*b* indicating a real-time call is established (illustrated as 554). The speech-controlled device 110*a* and/or the speech-controlled device 110*b* then outputs a signal representing a user can speak as if s/he were conducting a point-to-point call (illustrated as 556). The signal output by one or both of the speech-controlled devices 110*a*/110*b* may be a static indication or motion indication as described herein below. The system then performs the real-time communication session (illustrated as 558). The real-time communication session may be performed by the system until another communication alteration trigger (as detailed herein) is determined.

Figure 7:
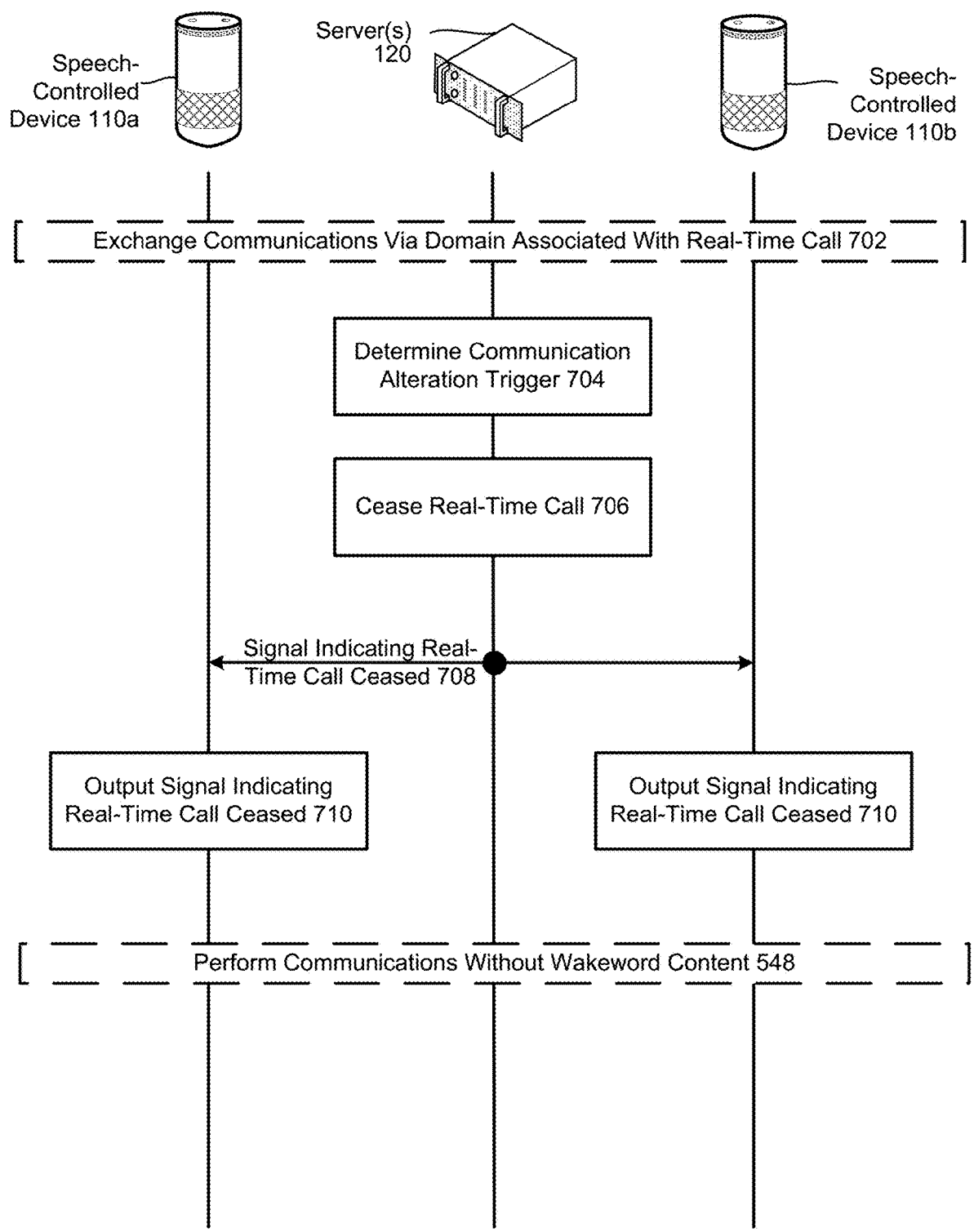
FIG. 7 is a signal flow diagram illustrating alteration of a voice-based interaction via speech-controlled devices.

FIG. 7 illustrates alteration of a voice-based interaction via speech-controlled devices. The server 120 exchanges communications between the speech-controlled devices 110*a*/110*b* via a domain and associated protocol(s) associated with real-time calls (illustrated as 702) until the server 120 determines the occurrence of a communication alteration trigger (illustrated as 704). Such a domain may be the real-time call domain 304, for example. The communication alteration trigger may take on various forms. The communication alteration trigger may be based on users of either of the speech-controlled devices 110*a*/110*b* multitasking (i.e., causing the server 120 to perform tasks not associated with a real-time call). The communication alteration trigger may also or alternatively be based on a threshold period of inactivity being met or exceeded (e.g., a determination that an exchange has not happened with n amounts of minutes). The communication alteration trigger may also or alternatively be based on a user directive (e.g., a user of either of the speech-controlled devices 110*a*/110*b* stating, for example, "close the call," "stop the call," "cease the call," etc.). The communication alteration trigger may also or alternatively be based on indications originating from users of both the speech-controlled devices 110*a*/110*b* (e.g., both the users stating "bye," "goodbye," etc. within a threshold period of seconds of each other). In addition, the communication alteration trigger may also or alternatively be based on the server 120 detecting a wakeword in an exchange of the real-time call. Communication alteration may occur based on satisfaction of one or more than one communication alteration triggers being determined.

After determining alteration should occur, the server 120 ceases the real-time call (illustrated as 706) and sends a signal representing such to one or both of the speech-controlled devices 110*a*/110*b* (illustrated as 708). The speech-controlled device 110*a* and/or the speech-controlled device 110*b* then outputs a signal representing the real-time call has ceased (illustrated as 710). The signal output by one or both of the speech-controlled devices 110*a*/110*b* may be a static indication or motion indication as described herein below. Altering the communication may involve ceasing all communication between the speech-controlled devices 110*a*/110*b* at that point in time. Alternatively, altering the communication may involve changing the communication to a second form, different from a real-time call. For example, the second form of communication may involve the server 120 performing instant message communications between the first speech-controlled device 110*a* and the second speech-controlled device 110*b* as detailed herein above with respect to steps 534-546 of FIGS. 5C through 5D (illustrated as 548), until the server 120 determines the occurrence of a communication alteration trigger.

Figure 8A:
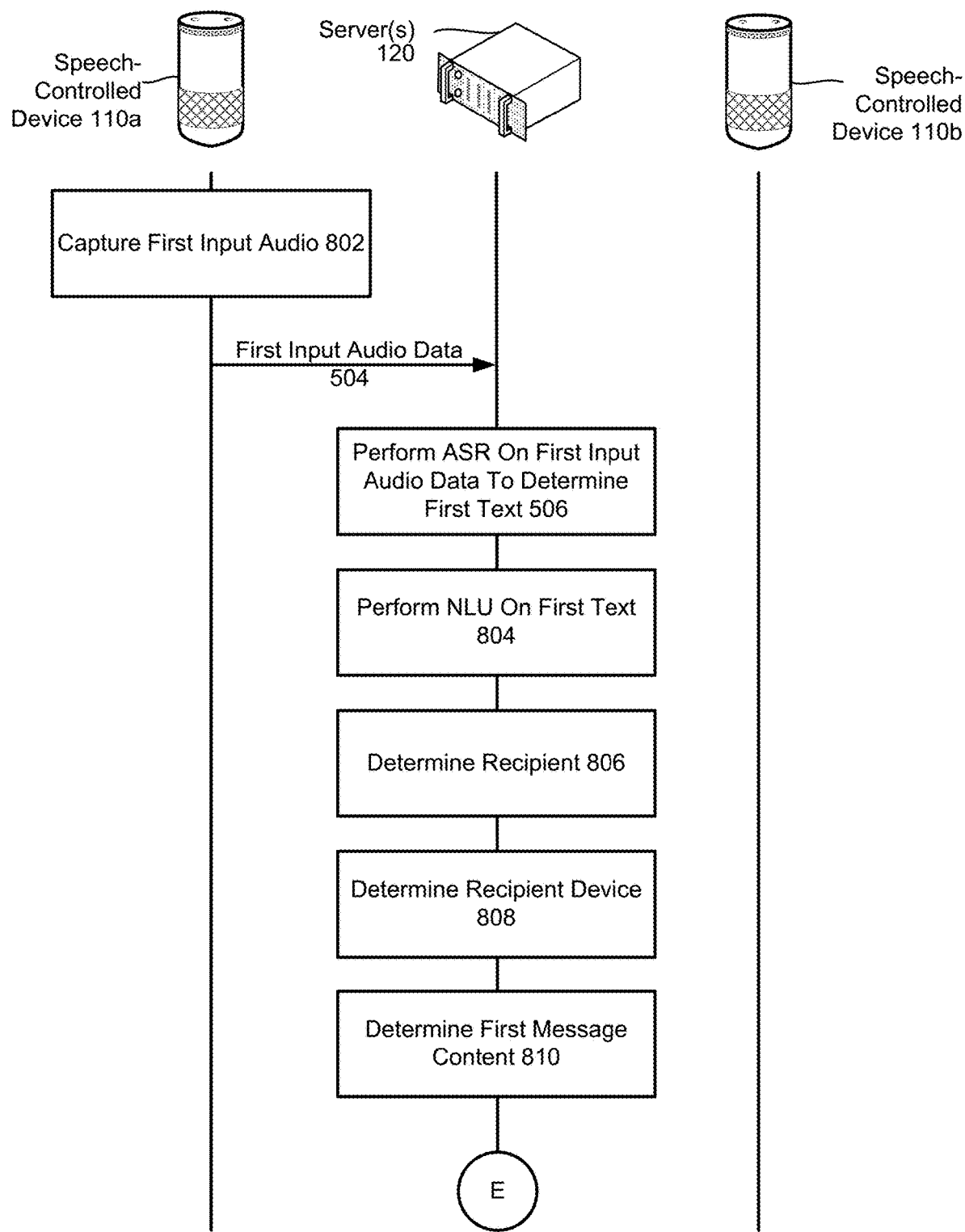

FIGS. 8A and 8B illustrate the output of signaling via user interfaces of speech-controlled devices. The speech-controlled device 110*a* captures spoken audio (illustrated as 802), compiles the captured spoken audio into audio data, and sends the audio data to the server 120 (illustrated as 504).

The server 120 performs ASR on the audio data to determine text (e.g., "tell John Smith I said hello") (illustrated as 506) and performs NLU on the text (illustrated as 804). The server 120 locates tagged recipient information (i.e., "John Smith") within the NLU processed text (illustrated as 806) and therefrom determines a recipient device (illustrated as 808). For example, the server 120 may access a user profile associated with the speech-controlled device 110*a* and/or its user. Using the user profile, the server 120 may locate text corresponding to the recipient information (i.e., "John Smith") within a table, and may identify recipient device information associated with the recipient information within the table. The server 120 also determines tagged message content (e.g., "hello") within the NLU processed text (illustrated as 810).

The server 120 sends a signal indicating the message content is or will be sent to the recipient device (i.e., the speech-controlled device 110*b*) to the speech-controlled device 110*a* from which the initial spoken audio data originated (illustrated as 812). In response to receiving the message, the speech-controlled device 110*a* outputs a visual indication representing the message content (i.e., hello) is or will be sent to the recipient device (illustrated as 814). For example, a visual indication may include outputting a static indicator (e.g., a certain color, etc.) or a motion indicator (e.g., a blinking or strobing element, continuous movement, etc.). The visual indication output may be configured according to a user profile preference. Optionally, in response to receiving the message, the speech-controlled device 110 may output a tactile and/or an audible indication (illustrated as 816). The tactile indication may include the speech-controlled device 110*a* vibrating and/or a remote device in communication with the speech-controlled device 110*a* (e.g., a smart watch) vibrating. The remote device and the speech-controlled device 110*a* may be in communication by being located in a single table of user devices associated with a user profile. The audible indication may include computer generated/TTS generated speech and/or user generated speech corresponding to, for example, "your message is being sent" or "your message will be sent momentarily." The audible indication, like the tactile indication, may be output by the speech-controlled device 110a, a remote microphone array, and/or a remote device (e.g., a smart watch). The remote device, the microphone array, and the speech-controlled device 110a may be in communication by being located in a single table of user devices associated with a user profile.

The server 120 also sends audio data including the message content to the determined recipient device (i.e., the speech-controlled device 110b) (illustrated as 818). It should be appreciated that steps 814-818 (as well as other steps of other figures) may occur in various orders, and may also occur concurrently. The speech-controlled device 110b then outputs audio corresponding to the message content (illustrated as 522). When the speech-controlled device 110b detects speech responding to the message content (illustrated as 820), and the speech-controlled device 110b sends a signal representing such to the server 120 (illustrated as 822). The server 120 then sends a signal to the speech-controlled device 110a indicating the speech-controlled device 110b is detecting speech (illustrated as 824). The server 120 may determine the detected speech is in response to the output audio based on, for example, the name of the recipient indicated in the detected speech or the speech-controlled devices 110a/110b being part of an instant message exchange that does not require wakeword audio data. In addition, in an example, the server 120 may cause the speech-controlled device 110b to output audio asking a user whether the user want to reply to the received message. The server 120 may then receive audio data from the second speech-controlled device 110b, perform ASR on the audio data to determine text data, determine the text data includes at least one word indicating an intent to respond (e.g., yes), and therefrom determines audio data received thereafter is in response to the original message. In another example, the server 120 may receive audio data from the second speech-controlled device 110b, determine using speech processing that an audio signature of the received audio data matches a voice-based speaker ID of the recipient of the original message, and therefrom determine audio data received thereafter is in response to the original message. In response to receiving the signal, the speech-controlled device 110a outputs a visual indication representing the speech-controlled device 110b is detecting speech (illustrated as 826). For example, the visual indication may include outputting a static indicator (e.g., a certain color, etc.) or a motion indicator (e.g., a blinking or strobing element, continuous movement, etc.). The visual indication output may be configured according to a user profile preference. In an example, audio spoken by the recipient in response to the original message may be output by the speech-controlled device 110a as soon as the visual indication is no longer output. Optionally, in response to receiving the signal, the speech-controlled device 110a may output a tactile and/or an audible indication (illustrated as 828). The tactile indication may include the speech-controlled device 110a vibrating and/or a remote device in communication with the speech-controlled device 110a (e.g., a smart watch) vibrating. The remote device and the speech-controlled device 110a may be in communication by being located in a single table of user devices associated with a user profile. The audible indication may include computer generated/TTS generated speech and/or user generated speech corresponding to, for example, "John Smith is responding to your message" or "John Smith is speaking." The audible indication, like the tactile indication, may be output by the speech-controlled device 110a, a remote microphone array, and/or a remote device (e.g., a smart watch). The remote device, the microphone array, and the speech-controlled device 110a may be in communication by being located in a single table of user devices associated with a user profile.

FIG. 9 illustrates the output of signaling via user interfaces of speech-controlled devices. A speech-controlled device 110a captures spoken audio including a wakeword portion and recipient information (illustrated as 902). The speech-controlled device 110a converts the captures recipient information audio into audio data and sends the audio data to the server 120 (illustrated as 904). Alternatively, the speech-controlled device 110a may send audio data corresponding to both the wakeword portion and the recipient information to the server 120. In this example, the server 120 may isolate the recipient information audio data from the wakeword portion audio data, and discard the wakeword portion audio data. The server 120 may perform speech processing (e.g., ASR and NLU) on the recipient information audio data (illustrated as 906). For example, the server 120 may perform ASR on the recipient information audio data to create recipient information text data, and may perform NLU on the recipient information text data to identify the recipient name. If the speech-controlled device 110a from which the received audio data originated is associated with multiple users, the server 120 may perform various processes to determine which user spoke the wakeword portion and recipient information audio (illustrated as 908).

Using the speech-processed recipient information audio data and knowing the speaker of the recipient information audio, the server 120 determines a device of the recipient, to send future data to, using a user profile associated with the speaker of the recipient information audio (illustrated as 910). If the recipient is associated with only one device in the user profile, that is the device to which data will be sent. If the recipient is associated with multiple devices in the user profile, various information may be used to determine which recipient device to send data to. For example, a physical location of the recipient may be determined, and data may be sent to the device most proximate to the recipient. In another example, it may be determined which device of the recipient is presently in use, and data may be sent to the device presently in use. In yet another example, it may be determined which device of the recipient is presently in use, and data may be sent to a second device most proximate to the device presently in use. In another example, the device determined by the server 120 (i.e., the device to which future data will be sent) may be a distributor device (e.g., a router), with the distributor device determining which of multiple devices of the recipient to send data to.

The server 120 sends a signal indicated a message is forthcoming to the determined device of the recipient (illustrated as 912). The signal may be sent to the recipient device while the server 120 sends message content text data to a TTS component. For purposes of illustration, the determined device of the recipient may be the speech-controlled device 110b. The speech-controlled device 110b then outputs an indication representing a message is forthcoming (illustrated as 914). The indication output by the speech-controlled device may be a visual indication, audible indication, and/or tactile indication as described herein.

The speech-controlled device 110a of the message sender also captures spoken audio including message content (illustrated as 916). The speech-controlled device 110a converts the message content spoken audio into audio data, and sends the message content audio data to the server 120 (illustrated as 918). In an example, the speech-controlled device 110b outputs the indication while the speech-controlled device 110a captures the message content audio and while the server 120 receives the message content audio from the speech-controlled device 110a. The server 120 may send the message content audio data to the previously determined recipient device (illustrated as 920), which outputs audio including the message content (illustrated as 922). Alternatively, the server 120 may perform processes as described herein above with respect to step 910 to determine which recipient device to send the message content audio data to. Thus, it should be appreciated that the recipient device that outputs the indication representing the message is forthcoming and the recipient device that outputs the message content may be the same device or may be different devices depending upon the situation.

FIGS. 10A through 10C illustrate examples of a visual indicator as discussed herein. The visual indication may be output via a light ring 1002 of the speech-controlled device 110. The light ring 1002 may be located anywhere on the speech-controlled device 110 that enables adequate viewing by a user of the speech-controlled device 110. Different colors may be output via the light ring 1002 depending upon the message to be communicated. For example, the light ring 1002 may emit a green light to indicate the message is or will be sent to a recipient device. In another example, the light ring 1002 may emit a blue light to indicate the recipient device is detecting or capturing spoken audio. It should also be appreciated that the light ring 1002 may emit different shades of a single color to communicate different messages. For example, the light ring (illustrated as 1002a in FIG. 10A) may output a dark shade of a color to represent a first message, the light ring (illustrated as 1002b in FIG. 10B) may output a medium shade of a color to represent a second message, and the light ring (illustrated as 1002c in FIG. 10C) may output a light shade of a color to represent a third message. While three shades are illustrated, one skilled in the art should appreciate that more or less than three shades of a color may be implemented depending upon how many different messages are to be communicated. Further, while the visual indicator examples of FIGS. 10A through 10C may be static, they may also appear to move in some manner. For example, the visual indicators may blink, strobe, or continuously move around/along a surface of the device 110.

FIGS. 11A and 11B illustrate a motion indication as described herein. As illustrated, the light ring 1002 may be configured to look as if a portion of the light ring 1002 is moving about the speech-controlled device 110. While not illustrated, it should also be appreciated that the light ring 1002 and/or the LED 1202/1204 may be configured to blink, strobe, etc.

Figure 12:
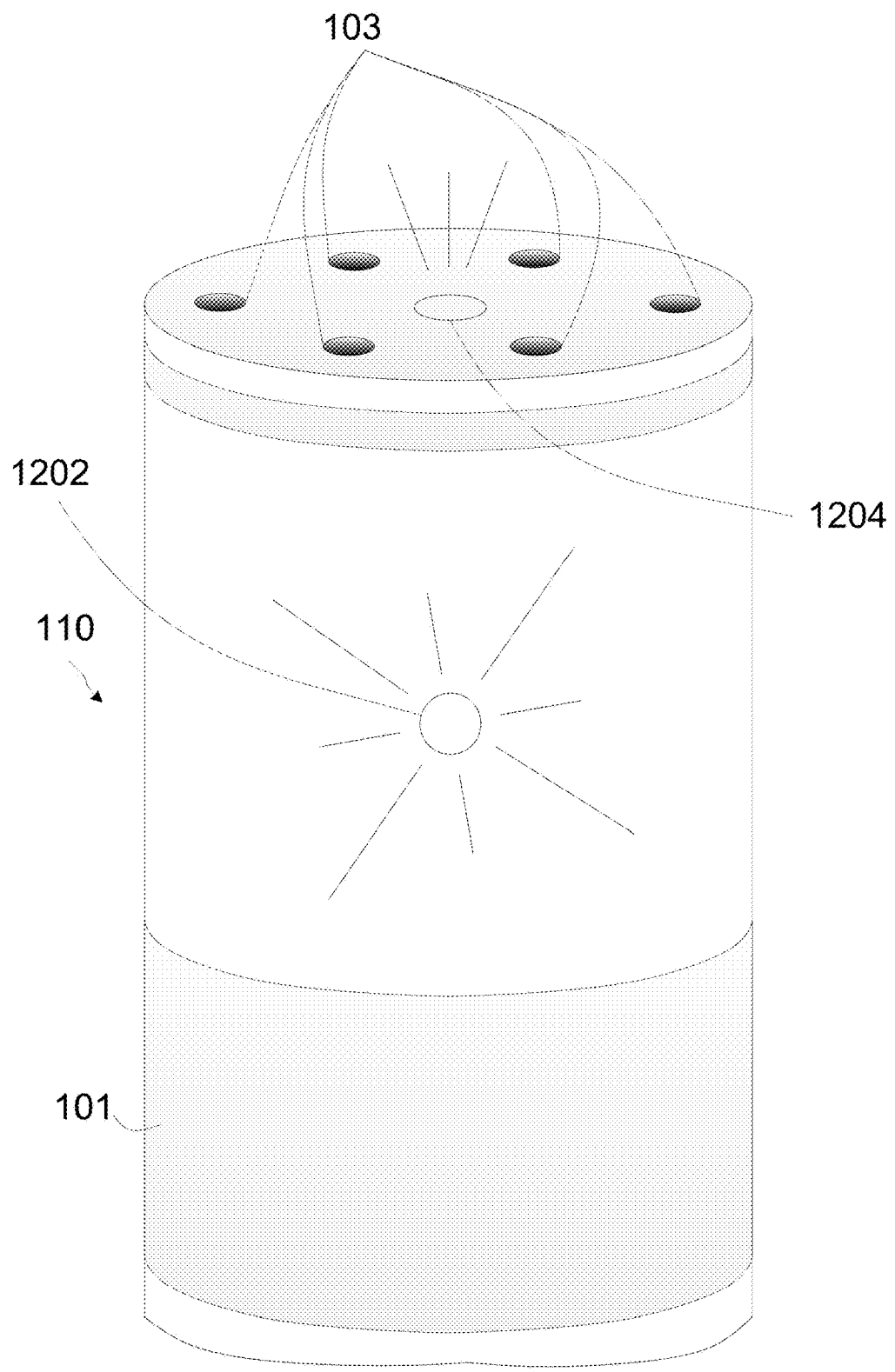
FIG. 12 illustrates an example signal output to a user via a speech-controlled device.

FIG. 12 illustrates another visual indication as described herein. According to FIG. 11, the static visual indication may be output via an LED 1202/1204 or some other like light generating device. The LED 1202/1204 may be located anywhere on the speech-controlled device 110 that enables adequate viewing by a user of the speech-controlled device 110. Different colors may be output via the LED 1202/1204 depending upon the message to be communicated. For example, the LED 1202/1204 may emit a green light to indicate the message is or will be sent to a recipient device. In another example, the LED 1202/1204 may emit a blue light to indicate the recipient device is detecting or capturing spoken audio. It should also be appreciated that the LED 1202/1204 may emit different shades of a single color to communicate different messages. For example, the LED 1202/1204 may output a dark shade of a color to represent a first message, a medium shade of a color to represent a second message, and a light shade of a color to represent a third message. While three shades are described, one skilled in the art should appreciate that more or less than three shades of a color may be implemented depending upon how many different messages are to be communicated. It should be appreciated that both the light ring 1002 and the LED 1202/1204 may be implemented on the same speech-controlled device 110, and that different variations of the indications described (and others) may be used.

While visual indicators are discussed above as examples of indicators, other indicators such as audio indicators, haptic indicators, etc., may be used to indicate an incoming message, reply being spoken, etc.

FIG. 13 is a block diagram conceptually illustrating a user device 110 (for example speech-controlled devices 110a and 110b as herein described) that may be used with the described system. FIG. 14 is a block diagram conceptually illustrating example components of a remote device, such as a remote server 120 that may assist with ASR processing, NLU processing, or command processing. Multiple such servers 120 may be included in the system, such as one server(s) 120 for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1304/1404), that may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive (MRAM) and/or other types of memory. Each device may also include a data storage component (1308/1408), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1302/1402).

Computer instructions for operating each device (110/120) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120) includes input/output device interfaces (1302/1402). A variety of components may be connected through the input/output device interfaces (1302/1402), as will be discussed further below. Additionally, each device (110/120) may include an address/data bus (1324/1424) for conveying data among components of the respective device. Each component within a device (110/120) may also be directly connected to other components in addition to (or instead of) being connected to other components across the bus (1324/1424).

Referring to the device 110 of FIG. 13, the device 110 may include a display 1318, which may comprise a touch interface 1019 configured to receive limited touch inputs. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1302 that connect to a variety of components such as an audio output component such as a speaker 101, a wired headset or a wireless headset (not illustrated) or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 (using microphone 103, wakeword detection module 220, ASR module 250, etc.) may be configured to determine audio data corresponding to detected audio data. The device 110 (using input/output device interfaces 1002, antenna 1014, etc.) may also be configured to transmit the audio data to server 120 for further processing or to process the data using internal components such as a wakeword detection module 220.

For example, via the antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1308 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1308 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 13 and 14, are exemplary, and may be located as a stand-alone device or may be included, in whole or in part, as a component of a larger device or system.

To create output speech, the server 120 may be configured with a text-to-speech ("TTS") module 1410 that transforms text data into audio data representing speech. The audio data may then be sent to the device 110 for playback to the user, thus creating the output speech. The TTS module 1410 may include a TTS storage for converting the input text into speech. The TTS module 1410 may include its own controller(s)/processor(s) and memory or may use the controller/processor and memory of the server(s) 120 or other device, for example. Similarly, the instructions for operating the TTS module 1410 may be located within the TTS module 1410, within the memory and/or storage of the server(s) 120, or within an external device.

Text input into a TTS module 1410 may be processed to perform text normalization, linguistic analysis, and linguistic prosody generation. During text normalization, the TTS module 1410 processes the text input and generates standard text, converting such things as numbers, abbreviations (such as Apt., St., etc.), and symbols ($, %, etc.) into the equivalent of written out words.

During linguistic analysis the TTS module 1410 analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module 1410 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system 100, for example in the TTS storage. The linguistic analysis performed by the TTS module 1410 may also identify different grammatical components such as prefixes, suffixes, phrases, punctuation, syntactic boundaries, or the like. Such grammatical components may be used by the TTS module 1410 to craft a natural sounding audio waveform output. The language dictionary may also include letter-to-sound rules and other tools that may be used to pronounce previously unidentified words or letter combinations that may be encountered by the TTS module 1410. Generally, the more information included in the language dictionary, the higher quality the speech output.

Based on the linguistic analysis, the TTS module 1410 may then perform linguistic prosody generation where the phonetic units are annotated with desired prosodic characteristics, also called acoustic features, which indicate how the desired phonetic units are to be pronounced in the eventual output speech. During this stage the TTS module 1410 may consider and incorporate any prosodic annotations that accompanied the text input. Such acoustic features may include pitch, energy, duration, and the like. Application of acoustic features may be based on prosodic models available to the TTS module 1410. Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module 1410, the TTS module 1410 may assign more robust and complex prosodic characteristics that vary across the portion, thus making the portion sound more human, resulting in higher quality audio output.

The TTS module 1410 may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module 1410 may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module 1410 may perform speech synthesis using one or more different methods. In one method of synthesis called unit selection, described further below, the TTS module 1410 matches the symbolic linguistic representation against a database of recorded speech, such as a database of a voice corpus. The TTS module 1410 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module 1410 may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module 1410 to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module 1410 may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

As illustrated in FIG. 15 multiple devices (120, 110, 110*c*-110*f*) may contain components of the system 100 and the devices may be connected over a network 199. Network 199 may include a local or private network or may include a wide network such as the Internet. Devices may be connected to the network 199 through either wired or wireless connections. For example, a speech controlled device 110, a tablet computer 110*e*, a smart phone 110*c*, a smart watch 110*d*, and/or a vehicle 110*f* may be connected to the network 199 through a wireless service provider, over a WiFi or cellular network connection or the like. Other devices are included as network-connected support devices, such as a server 120, application developer devices, or others. The support devices may connect to the network 199 through a wired connection or wireless connection. Networked devices 110 may capture audio using one-or-more built-in or connected microphones 103 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A system comprising:
   at least one processor; and
   memory including instructions operable to be executed by the at least one processor to configure the system to:
   receive, from a first speech-controlled device, first input audio data including message content and recipient information;
   determine a second speech-controlled device associated with the recipient information;
   send, to the second speech-controlled device, a first signal corresponding to a synchronous communication with the first speech-controlled device;
   send, to the second speech-controlled device, first output audio data including the message content;
   receive, from the second speech-controlled device a second signal indicating that speech is detected by the second speech-controlled device;
   send, to the first speech-controlled device, a third signal indicating that speech is detected by the second speech-controlled device, the third signal causing the first speech-controlled device to, during a first time period, output a first indication representing a reply to the message content is being received by the second speech-controlled device;
   receive, from the second speech-controlled device, second input audio data including reply message content; and
   during a second time period after the first time period, send, to the first speech-controlled device, second output audio data including the reply message content.

2. The system of claim 1, wherein the instructions that configure the system to determine the second speech-controlled device comprise instructions that, when executed by the at least one processor configure the system to:
   access a user profile associated with the first speech-controlled device; and
   identify the recipient information in the user profile.

3. The system of claim 1, wherein the instructions that configure the system to determine the second speech-controlled device comprise instructions that, when executed by the at least one processor configure the system to:
   determine a location of the recipient; and
   select the second speech-controlled device, from a plurality of devices associated with a recipient profile, based on the second speech-controlled device being proximate to the recipient.

4. The system of claim 1, wherein the instructions that configure the system to determine the second speech-controlled device comprise instructions that, when executed by the at least one processor configure the system to determine the second speech-controlled device is presently in use.

5. The system of claim 1, wherein the instructions that configure the system to determine the second speech-controlled device comprise instructions that, when executed by the at least one processor configure the system to:
   determine a third speech-controlled device, from a plurality of devices including the second speech-controlled device, is presently in use; and
   select the second speech-controlled device based on its proximity to the third speech-controlled device.

6. The system of claim 1, wherein the first indication is comprised of a color or the color having a motion.

7. The system of claim 1, wherein the first indication is output by the first speech-controlled device while the second input audio data is received from the second speech-controlled device.

8. The system of claim 1, wherein the first indication is an audible indication, the audible indication being generated using text-to-speech (TTS) processing.

9. The system of claim 1, wherein the memory further comprises instructions operable to be executed by the at least one processor to further configure the system to:
   select a type of output for the first indication based at least in part on the reply message content.

10. The system of claim 1, wherein the memory further comprises instructions operable to be executed by the at least one processor to further configure the system to:
  select a type of output for the first indication based at least in part on a domain being used to exchange the message content and the reply to the message content.

11. A computer-implemented method comprising:
  receiving, from a first speech-controlled device, first input audio data including recipient message content and information;
  determining a second speech-controlled device associated with the recipient information;
  sending, to the second speech-controlled device, a first signal corresponding to a synchronous communication with the first speech-controlled device;
  sending, to the second speech-controlled device, first output audio data including the message content;
  receiving, from the second speech-controlled device a second signal indicating that speech is detected by the second speech-controlled device;
  sending, to the first speech-controlled device, a third signal indicating that speech is detected by the second speech-controlled device, the third signal causing the first speech-controlled device to, during a first time period, output a first indication representing a reply to the message content is being received by the second speech-controlled device;
  receiving, from the second speech-controlled device, second input audio data including the reply message content; and
  during a second time period after the first time period, sending, to the first speech-controlled device, second output audio data including the reply message content.

12. The computer-implemented method of claim 11, wherein determining the second speech-controlled device comprises:
  accessing a user profile associated with the first speech-controlled device; and
  identifying the recipient information in the user profile.

13. The computer-implemented method of claim 11, wherein determining the second speech-controlled device comprises:
  determining a location of the recipient; and
  selecting the second speech-controlled device, from a plurality of devices associated with a recipient profile, based on the second speech-controlled device being proximate to the recipient.

14. The computer-implemented method of claim 11, wherein determining the second speech-controlled device comprises determining the second speech-controlled device is presently in use.

15. The computer-implemented method of claim 11, wherein determining the second speech-controlled device comprises:
  determining a third speech-controlled device, from a plurality of devices including the second speech-controlled device, is presently in use; and
  selecting the second speech-controlled device based on its proximity to the third speech-controlled device.

16. The computer-implemented method of claim 11, wherein the first indication is comprised of a color or the color having a motion.

17. The computer-implemented method of claim 11, wherein the first indication is output by the first speech-controlled device while the second input audio data is received from the second speech-controlled device.

18. The computer-implemented method of claim 11, wherein the first indication is an audible indication, the audible indication being generated using text-to-speech (TTS) processing.

19. The computer-implemented method of claim 11, further comprising:
  selecting a type of output for the first indication based at least in part on the reply message content.

20. The computer-implemented method of claim 11, further comprising:
  selecting a type of output for the first indication based at least in part on a domain being used to exchange the message content and the reply to the message content.

* * * * *